United States Patent
Sakamoto et al.

(10) Patent No.: US 9,276,258 B2
(45) Date of Patent: Mar. 1, 2016

(54) POSITIVE ELECTRODE ACTIVE MATERIAL FOR ALKALINE STORAGE BATTERY, POSITIVE ELECTRODE FOR ALKALINE STORAGE BATTERY, ALKALINE STORAGE BATTERY, AND METHOD FOR MANUFACTURING POSITIVE ELECTRODE ACTIVE MATERIAL FOR ALKALINE STORAGE BATTERY

(75) Inventors: Hiroyuki Sakamoto, Toyohashi (JP); Kazuhiro Ohkawa, Kosai (JP); Shinichi Yuasa, Kyotanabe (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1894 days.

(21) Appl. No.: 11/658,805

(22) PCT Filed: Jul. 15, 2005

(86) PCT No.: PCT/JP2005/013532
§ 371 (c)(1),
(2), (4) Date: Jan. 30, 2007

(87) PCT Pub. No.: WO2006/011430
PCT Pub. Date: Feb. 2, 2006

(65) Prior Publication Data
US 2009/0202909 A1 Aug. 13, 2009

(30) Foreign Application Priority Data

Jul. 30, 2004 (JP) ................................. 2004-224544

(51) Int. Cl.
*H01M 4/32* (2006.01)
*B05D 5/12* (2006.01)
(Continued)

(52) U.S. Cl.
CPC ................. *H01M 4/32* (2013.01); *C01G 51/04* (2013.01); *C01G 53/006* (2013.01); *C01G 53/04* (2013.01);
(Continued)

(58) Field of Classification Search
None
See application file for complete search history.

(56) References Cited

U.S. PATENT DOCUMENTS 6,007,946 A 12/1999 Yano et al.
6,083,642 A * 7/2000 Kato et al. ................. 429/218.1
(Continued)

FOREIGN PATENT DOCUMENTS

CN 1174418 2/1998
EP 0 789 408 8/1997
(Continued)

OTHER PUBLICATIONS

IPDL JPO machine translation for JP 11-219703 (Tokuda et al.), Aug. 1999.*
(Continued)

*Primary Examiner* — Barbara Gilliam
*Assistant Examiner* — Adam A Arciero
(74) *Attorney, Agent, or Firm* — Finnegan, Henderson, Farabow, Garrett & Dunner, LLP

(57) ABSTRACT

There are provided a positive electrode active material for an alkaline storage battery, a positive electrode for an alkaline storage battery, and an alkaline storage battery each of which has an excellent output characteristics and also has an excellent self-discharge characteristic and an excellent cycle lifetime characteristic. The positive electrode active material for an alkaline storage battery according to the present invention has nickel hydroxide particles each containing at least magnesium in a solid solution state and a cobalt compound layer coating the surface of each of the nickel hydroxide particles. Among them, the cobalt compound layer contains cobalt having an average valence of not less than 2.6 and not more than 3.0 and also contains sodium at a proportion of less than 0.10 wt % to the total weight of the cobalt compound layer. The positive electrode active material for an alkaline storage battery according to the present invention has a conductivity smaller than $1.0 \times 10^{-5}$ S/cm in a state pressurized at 39.2 MPa.

14 Claims, 4 Drawing Sheets

(51) Int. Cl.

| | |
|---|---|
| *C01G 53/00* | (2006.01) |
| *H01M 4/04* | (2006.01) |
| *H01M 4/26* | (2006.01) |
| *H01M 4/36* | (2006.01) |
| *H01M 4/52* | (2010.01) |
| *H01M 10/30* | (2006.01) |
| *C01G 51/04* | (2006.01) |
| *C01G 53/04* | (2006.01) |
| *H01M 4/38* | (2006.01) |
| *H01M 4/62* | (2006.01) |
| *H01M 10/34* | (2006.01) |
| *H01M 4/02* | (2006.01) |

(52) U.S. Cl.
CPC .............. *H01M 4/0497* (2013.01); *H01M 4/26* (2013.01); *H01M 4/364* (2013.01); *H01M 4/366* (2013.01); *H01M 4/52* (2013.01); *H01M 10/30* (2013.01); *C01P 2002/54* (2013.01); *C01P 2002/72* (2013.01); *C01P 2004/61* (2013.01); *C01P 2004/80* (2013.01); *C01P 2004/82* (2013.01); *C01P 2004/84* (2013.01); *C01P 2006/12* (2013.01); *C01P 2006/40* (2013.01); *H01M 4/383* (2013.01); *H01M 4/62* (2013.01); *H01M 10/345* (2013.01); *H01M 2004/021* (2013.01); *H01M 2004/028* (2013.01); *H01M 2300/0014* (2013.01); *Y02E 60/124* (2013.01)

(56) References Cited

U.S. PATENT DOCUMENTS

| | | | | |
|---|---|---|---|---|
| 6,251,538 | B1 * | 6/2001 | Seyama et al. | ................ 429/223 |
| 6,602,640 | B1 | 8/2003 | Kihara et al. | |
| 2002/0024041 | A1 * | 2/2002 | Tanigawa et al. | ............. 252/512 |
| 2002/0098415 | A1 | 7/2002 | Sakamoto et al. | |

FOREIGN PATENT DOCUMENTS

| | | |
|---|---|---|
| EP | 1 113 512 | 7/2001 |
| EP | 1 164 650 | 12/2001 |
| EP | 1 172 869 | 1/2002 |
| EP | 1 172 870 | 1/2002 |
| JP | 62-015769 | 1/1987 |
| JP | 08-148146 | 6/1996 |
| JP | 09-210941 | 8/1997 |
| JP | 09-219192 | 8/1997 |
| JP | 10-302788 | 11/1998 |
| JP | 10-326617 | 12/1998 |
| JP | H11176431 | 7/1999 |
| JP | 11 219703 | 8/1999 |
| JP | 2000-021400 | 1/2000 |
| JP | 2001-052696 | 2/2001 |
| JP | 2001-332257 | 11/2001 |
| JP | 2001-357844 | 12/2001 |
| JP | 2002-110154 | 4/2002 |
| JP | 2003-249215 | 9/2003 |
| JP | 2003-303590 | 10/2003 |
| JP | 2004-071304 | 3/2004 |

OTHER PUBLICATIONS

International Search Report.
Supplementary European Search Report dated Mar. 25, 2008.
Notification of the First Office Action for Chinese Appl. No. 2005800255813, dated Jun. 6, 2008.
Office Action for U.S. Appl. No. 12/926,155 dated Apr. 12, 2012.
Office Action for U.S. Appl. No. 12/926,155 dated Feb. 28, 2013.
Office Action for U.S. Appl. No. 12/926,155 dated Jun. 19, 2013.

* cited by examiner

POSITIVE ELECTRODE ACTIVE MATERIAL FOR ALKALINE STORAGE BATTERY, POSITIVE ELECTRODE FOR ALKALINE STORAGE BATTERY, ALKALINE STORAGE BATTERY, AND METHOD FOR MANUFACTURING POSITIVE ELECTRODE ACTIVE MATERIAL FOR ALKALINE STORAGE BATTERY

TECHNICAL FIELD

The present invention relates to a positive electrode active material for an alkaline storage battery, a positive electrode for an alkaline storage battery, an alkaline storage battery, and a method for manufacturing a positive electrode active material for an alkaline storage battery.

BACKGROUND ART

In recent years, an alkaline storage battery has drawn attention as a power source for a portable instrument or devices or also as a power source for an electric vehicle, a hybrid electric vehicle, or the like. As such an alkaline storage battery, various types have been proposed. Among them, a nickel-metal hydride secondary battery comprising: a positive electrode made of an active material primarily containing nickel hydroxide; a negative electrode containing a hydrogen absorbing alloy as a main component; and an alkaline electrolyte containing potassium hydroxide or the like has rapidly become widespread as a secondary battery having a high energy density and excellent reliability.

The positive electrodes of nickel-metal hydride secondary batteries are roughly divided into two types depending on the difference between production methods therefor, which are a sintered nickel electrode and a paste (non-sintered) nickel electrode. Of the two types, the sintered nickel electrode is produced by precipitating nickel hydroxide in extremely fine pores in a porous sintered substrate obtained by sintering nickel fine powder onto the both sides of a punched steel plate (punching metal) by a solution impregnation method or the like. On the other hand, the paste nickel electrode is produced by filling an active material containing nickel hydroxide directly into fine pores in a high-porosity substrate using a foamed nickel porous body (formed nickel substrate) (see, e.g., Patent Document 1).

Patent Document 1: Jpn. unexamined patent publication No. 62 (1987)-15769
Patent Document 2: Jpn. patent No. 3363670
Patent Document 3: Jpn. patent No. 3234492
Patent Document 4: Jpn. unexamined patent publication No. 2001-357844

Since the paste nickel electrode is high in the filling density of nickel hydroxide and easy to be increased in energy density, it has currently become the main stream of a positive electrode for a nickel-metal hydride storage battery. In recent years, attempts have been made to improve the active-material utilization ratio, high-rate discharge characteristic, and output characteristic of the paste nickel electrode by improving active material powder to be filled therein, a material to be added thereto, and the like (see, e.g., Patent Documents 2, 3, and 4).

In Patent Document 2, a thermal treatment is performed in the coexistence of oxygen and an alkali so that a coating layer made of a cobalt compound having a valence larger than 2 and a disturbed crystallinity is formed on the surface of each of nickel hydroxide particles containing one or more of zinc, cadmium, magnesium, and calcium. Since a cobalt compound having a valence larger than 2 has an extremely high conductivity, it is reported that the active-material utilization ratio is significantly improved. In addition, it is also reported that, by causing one or more of zinc, cadmium, magnesium, and calcium to be contained in a solid solution state in each of the nickel hydroxide particles, a reduction in capacity during over-discharging can be suppressed, while a high active-material utilization ratio is retained.

In Patent Document 3, a conductive layer made of a sodium-containing cobalt compound of which the content of sodium is adjusted to 0.1 to 10 wt % is formed on the surface of each of nickel hydroxide particles or grains containing nickel as a main component. It is reported that, with sodium being captured in the crystal of a cobalt compound, the compound having a high conductivity is provided and the active-material utilization ratio is thereby significantly increased.

Patent Document 4 has proved that, by using a solid solution of nickel hydroxide containing a small amount of magnesium, an excellent high-rate discharge characteristic and an excellent output characteristic are shown. By further using the solid solution of nickel hydroxide containing a small amount of magnesium for a positive electrode active material, the generation of $\gamma$-NiOOH can be suppressed so that the cycle lifetime of a battery is also improved.

DISCLOSURE OF THE INVENTION

Problems to be Solved by the Invention

In each of Patent Documents 2 and 3, the current collectivity of the positive electrode is improved and the active-material utilization ratio is increased by increasing the conductivity of the cobalt compound layer of the active material. However, it has also been proved that the increased conductivity of the cobalt compound layer significantly degrades the self-discharge characteristic. A presumable reason for this is that, when the cobalt compound layer having a high conductivity is preliminarily provided on the surface of nickel hydroxide, reactivity in the vicinity of the surface of nickel hydroxide is significantly improved so that the depth of charge is locally increased. Since a portion at such a locally increased depth of charge is at a high potential, it preferentially entails an oxygen generating reaction so that the self-discharge reaction proceeds conceivably. In the case of causing magnesium to be additionally contained in a solid solution state in nickel hydroxide in the active material to improve the high-rate discharge characteristic and the output characteristic (see Patent Document 4), the self-discharge is further accelerated conceivably. When the self-discharge of the positive electrode is accelerated, the reduction reaction of the cobalt compound proceeds with repeated charging and discharging. This may destroy a conduction path (conductive network) and degrade the cycle lifetime.

The present invention has been achieved in view of such a present situation and it is therefore an object of the present invention to provide a positive electrode active material for an alkaline storage battery, a positive electrode for an alkaline storage battery, an alkaline storage battery, and a method for manufacturing a positive electrode active material for an alkaline storage battery each of which has an excellent output characteristic and also has an excellent self-discharge characteristic and an excellent cycle lifetime characteristic.

Means for Solving the Problems

To solve the problems, the present invention provides a positive electrode active material for an alkaline storage battery, the positive electrode active material comprising: nickel hydroxide particles each containing at least magnesium in a solid solution state; and a cobalt compound layer coating a surface of each of the nickel hydroxide particles, wherein the cobalt compound layer contains cobalt having an average valence of not less than 2.6 and not more than 3.0, contains sodium at a proportion of less than 0.10 wt % to a total weight of the cobalt compound layer, and the positive electrode active material has a conductivity smaller than $1.0 \times 10^{-5}$ S/cm in a state in which the positive electrode active material is pressurized at 39.2 MPa.

The positive electrode active material for an alkaline storage battery according to the present invention has the nickel hydroxide particles each containing at least magnesium in a solid solution state. By causing each of the nickel hydroxide particles to contain at least magnesium in the solid solution state, it becomes possible to improve the high-rate discharge characteristic and the output characteristic. A conceivable reason for this is that, even in a charged state, the presence of magnesium which is diatomic and stable in the crystal of nickel hydroxide improves the electron conductivity of nickel hydroxide.

In addition, in the positive electrode active material for an alkaline storage battery according to the present invention, the average valence of cobalt contained in the cobalt compound layer coating the surface of each of the nickel hydroxide particles is adjusted to a value of not less than 2.6 and not more than 3.0. This allows an improvement in self-discharge characteristic (the suppression of self-discharge). Specifically, by adjusting the average valence of cobalt to a value of not less than 2.6, it becomes possible to suppress an increase in the proportion of cobalt oxyhydroxide having a high conductivity which is formed by charging through electrochemical oxidation in a battery. This makes it possible to suppress the degradation of the self-discharge characteristic.

By adjusting the average valence of cobalt to a value of not more than 3.0, it becomes possible to maintain the balance of charges in the crystal of the cobalt compound and thereby stabilize the cobalt compound. As a result, it becomes possible to suppress the reaction with the alkaline electrolyte in the battery and suppress the capture of cations such as sodium ions and potassium ions in the crystal. This makes it possible to suppress an increase in the electron conductivity of the cobalt compound and consequently improve the self-discharge characteristic.

Moreover, the proportion of sodium contained in the cobalt compound layer is adjusted to be smaller than 0.10 wt % relative to the total weight of the cobalt compound. By thus reducing the content of sodium, even when sodium ions are captured in the crystal of the cobalt compound, an excessive increase in the electron conductivity of the cobalt compound is prevented and the degradation of the self-discharge characteristic can be suppressed.

Furthermore, the positive electrode active material for an alkaline storage battery according to the present invention has a conductivity smaller than $1.0 \times 10^{-5}$ S/cm in a state pressurized at 39.2 MPa (400 kgf/cm$^2$). By thus reducing the conductivity, the self-discharge characteristic can be improved and the cycle lifetime characteristic is also improved.

Furthermore, in the above positive electrode active material for an alkaline storage battery, preferably, a proportion of the magnesium contained in the solid solution state in each of the nickel hydroxide particles is not less than 2 mol % and not more than 10 mol % to all metal elements contained in each of the nickel hydroxide particles.

In the positive electrode active material for an alkaline storage battery according to the present invention, the proportion of magnesium contained in the solid solution state in each of the nickel hydroxide particles to all the metal elements contained in the nickel hydroxide particle is adjusted to a value of not less than 2 mol % and not more than 10 mol %. By adjusting the proportion of magnesium to a value of not less than 2 mol %, it becomes possible to properly improve the high-rate discharge characteristic and the output characteristic. However, when the proportion of magnesium exceeds 10 mol %, the self-discharge may be extremely accelerated. To prevent this, the proportion of magnesium is adjusted to a value of not more than 10 mol % in the positive electrode active material for an alkaline storage battery according to the present invention. As a result, the self-discharge can be suppressed properly.

Furthermore, in any one of the above positive electrode active materials for an alkaline storage battery, preferably, the positive electrode active material contains 1.0 wt % or less of a sulfate group.

When the proportion of the sulfate group contained in the positive electrode active material exceeds 1.0 wt %, the sulfate group is captured in the crystal of the cobalt compound as a result of repeated charging and discharging so that the crystallinity of the cobalt compound is more likely to be lower. The cobalt compound having a low crystallinity is prone to reduction as a result of repeated charging and discharging and the self-discharge may not be suppressed properly. To prevent this, the proportion of the sulfate group contained in the positive electrode active material for an alkaline storage battery according to the present invention is adjusted to be a value of not more than 1.0 wt %. As a result, an excellent self-discharge characteristic can be retained over a long period of time.

Furthermore, in any one of the above positive electrode active materials for an alkaline storage battery, preferably, a peak half width of the (101) plane of each of the nickel hydroxide particles which is located in the vicinity of $2\theta=37°$ to 40° in X-ray diffraction using a CuKα beam is more than 0.7° and not more than 1.2°.

When the crystallinity of each of the nickel hydroxide particles becomes excessively high, specifically when the peak half width of the (101) plane located in the vicinity of $2\theta=37°$ to 40° in the X-ray diffraction using the CuKα beam is not more than 0.7°, the diffusion of protons is retarded (the reaction is inhibited) due to a small number of lattice defects and the high-rate discharge characteristic may be extremely degraded. Conversely, when the crystallinity of each of the nickel hydroxide particles becomes excessively low, specifically when the peak half width of the (101) plane located in the vicinity of $2\theta=37°$ to 40° in the X-ray diffraction using the CuKα beam exceeds 1.2°, the density of the nickel hydroxide particles in the positive electrode is likely to be lower. This may undesirably cause a reduction in the capacity density of the positive electrode.

To prevent this, the positive electrode active material for an alkaline storage battery according to the present invention uses the nickel hydroxide particles in each of which the peak half width of the (101) plane located in the vicinity of $2\theta=37°$ to 40° in the X-ray diffraction using the CuKα beam is more than 0.7° and not more than 1.2° so that there is no possibility of the occurrence of problems as described above. Hence, by using the positive electrode active material for an alkaline storage battery according to the present invention, it becomes possible to improve the high-rate discharge characteristic and increase the capacity density of the positive electrode.

Furthermore, in any one of the above positive electrode active materials for an alkaline storage battery, preferably, a cobalt compound composing the cobalt compound layer primarily contains cobalt oxyhydroxide and a peak half width of the (110) plane of the cobalt compound which is located in the vicinity of 2θ=64° to 67° in X-ray diffraction using a CuKα beam is not more than 1.5°.

The cobalt oxyhydroxide has a rhombo-hexagonal layered structure and an XRD pattern reported in the JCPDS inorganic material file under the entry No: 7-169. Cobalt oxyhydroxide is inherently low in electron conductivity since H$^+$ in the crystal structure thereof forms a strong hydrogen bond with O$^{2-}$ located thereabove and O$^{2-}$ located therebelow. However, when the crystallinity of cobalt oxyhydroxide is low, a large number of crystallite interfaces are formed. The crystallite interfaces function as electron conducting surfaces and thereby cause a high electron conductivity. When the crystallinity of cobalt oxyhydroxide is low, cations such as sodium ions are likely to be captured in the crystal thereof in a high-concentration aqueous alkaline solution (alkaline electrolyte) so that the electron conductivity tends to be higher. Therefore, when each of the nickel hydroxide particles is coated with a cobalt compound layer primarily containing cobalt oxyhydroxide with a low crystallinity, the electron conductivity becomes higher but the self-discharge is more likely to occur undesirably.

To prevent this, in the positive electrode active material for an alkaline storage battery according to the present invention, the cobalt compound composing the cobalt compound layer primarily contains cobalt oxyhydroxide and the peak half width of the (110) plane located in the vicinity of 2θ=64° to 67° in the X-ray diffraction using the CuKα beam is not more than 1.5°. The peak of the (110) plane located in the vicinity of 2θ=64° to 67° in the X-ray diffraction using the CuKα beam represents the peak of cobalt oxyhydroxide (see the entry No: 7-169 in the JCPDS inorganic material file). It follows therefore that the positive electrode active material for an alkaline storage battery according to the present invention is nickel hydroxide particles each coated with a cobalt compound layer primarily containing cobalt oxyhydroxide. In addition, cobalt oxyhydroxide having a half width of the peak which is not more than 1.5° has a high crystallinity and a low conductivity. Hence, by using the positive electrode active material for an alkaline storage battery according to the present invention, an excellent self-discharge characteristic and an excellent cycle lifetime characteristic can be obtained.

By selecting the peak of the (110) plane located in the vicinity of 2θ=64° to 67°, even when nickel hydroxide is contained in a measurement sample, there is no overlap between the peak of cobalt oxyhydroxide and the peak of nickel hydroxide at this location. Accordingly, the peak of cobalt oxyhydroxide can be sensed properly.

Furthermore, in any one of the above positive electrode active materials for an alkaline storage battery, preferably, the positive electrode active material has an average particle diameter of not less than 5 μm and not more than 20 μm.

To produce a positive electrode active material having an average particle diameter smaller than 5 μm, the residence time (reaction time) in the reaction vessel should be shortened. The positive electrode active material produced in a short time becomes bulky particles so that, by using the positive electrode active material having an average particle diameter smaller than 5 μm, the capacity density of the positive electrode is reduced undesirably. Conversely, when the positive electrode active material having an average particle diameter larger than 20 μm is used, the positive electrode is significantly expanded under the influence of the crystal structure of nickel hydroxide in the charge/discharge process.

Under this influence, the electrolyte in the separator is reduced (and eventually exhausted) so that the cycle lifetime characteristic is degraded.

To prevent this, the average particle diameter of the positive electrode active material for an alkaline storage battery according to the present invention is adjusted to a value of not less than 5 μm and not more than 20 μm so that there is no possibility of the occurrence of problems as described above. Hence, by using the positive electrode active material for an alkaline storage battery according to the present invention, the capacity density of the positive electrode can be increased and the cycle lifetime characteristic can also be improved.

Furthermore, in any one of the above positive electrode active materials for an alkaline storage battery, preferably, the cobalt compound layer has an average thickness of not more than 0.20 μm.

In the positive electrode active material for an alkaline storage battery according to the present invention, the average thickness of the cobalt compound layer is adjusted to be not more than 0.2 μm. By adjusting the average thickness of the cobalt compound layer to a value of not more than 0.2 μm, the undesirable possibility of the delamination of the cobalt compound layer from the nickel hydroxide particle can be reduced. In addition, since an electrochemical reaction on the surface of nickel hydroxide is improved, the charge/discharge efficiency is improved.

Furthermore, in any one of the above positive electrode active materials for an alkaline storage battery, preferably, a specific surface area measured by a BET method based on nitrogen gas adsorption is not less than 8.0 m$^2$/g and not more than $1.8 \times 10$ m$^2$/g.

When the specific surface area of the positive electrode active material is smaller than 8.0 m$^2$/g, the effective area of the solid solution interface as a place for a charge/discharge reaction is excessively small so that polarization is enlarged and the utilization ratio of the positive electrode active material is lowered. Conversely, when the specific surface area of the positive electrode active material is larger than $1.8 \times 10$ m$^2$/g, the electrolyte in the separator is more likely to move into the positive electrode. Consequently, the electrolyte in the separator is reduced (and eventually exhausted) and the cycle lifetime characteristic may be degraded.

To prevent this, the specific surface area, measured by a BET method based on nitrogen gas adsorption, of the positive electrode active material for an alkaline storage battery according to the present invention is adjusted to be not less than 8.0 m$^2$/g and not more than $1.8 \times 10$ m$^2$/g so that there is no possibility of the occurrence of problems as described above. Hence, by using the positive electrode active material for an alkaline storage battery according to the present invention, the utilization ratio of the positive electrode active material can be increased and the cycle lifetime characteristic can also be improved.

Furthermore, in any one of the above positive electrode active materials for an alkaline storage battery, preferably, the positive electrode active material is produced by supplying an aqueous solution containing cobalt ions into an aqueous solution containing nickel hydroxide particles, while supplying an aqueous sodium hydroxide solution into the aqueous solution containing the nickel hydroxide particles to maintain the pH thereof in a range of 11.5 to 13.5 and also supplying air thereinto.

The positive electrode active material for an alkaline storage battery according to the present invention is produced by supplying the aqueous solution containing cobalt ions into the aqueous sodium solution containing the nickel hydroxide particles, while supplying the aqueous hydroxide solution into the aqueous solution containing the nickel hydroxide particles to maintain the pH thereof in the range of 11.5 to 13.5. By adjusting the pH of the aqueous solution in a reaction vessel to a value of not less than 11.5, the crystallinity of the cobalt compound coating the surface of each of the nickel hydroxide particles can be increased. By further adjusting the pH of the aqueous solution in the reaction vessel to a value of not more than 13.5, the crystal growth of the cobalt compound can be accelerated and the possibility of the delamination of the cobalt compound layer from the nickel hydroxide particle can be reduced.

As a method for controlling the average valence of cobalt, there has been conventionally used a method which adds an oxidant such as hydrogen peroxide, sodium hypochloride, or potassium hypochloride or a method which performs oxidation by a thermal treatment. In accordance with the method which adds an oxidant, however, the oxidation reaction rapidly proceeds so that the average valence of cobalt tends to exceed 3.0. Accordingly, it has not been easy to adjust the average valence of cobalt to a value of not more than 3.0. As a result, a cobalt compound layer with a high conductivity and a low crystallinity has tended to be formed and the self-discharge of an alkaline storage battery has tended to increase. The method which performs oxidation by a thermal process is not preferred because, in accordance with the method, $Co_3O_4$ which inhibits the charge/discharge reaction and the like are likely to be produced. As a result of the examination made by the present inventors, it has been proved that, even when the cobalt compound is produced under conditions which suppress the production of $Co_3O_4$, the formed cobalt compound has a low crystallinity and a high conductivity. Thus, in each of the method which adds an oxidant and the method which performs oxidation by a thermal treatment, the self-discharge of the alkaline storage battery has tended to be enlarged.

To prevent this, the positive electrode active material for an alkaline storage battery according to the present invention is produced by supplying air. Specifically, the valence of cobalt is controlled by supplying air (oxygen) into the aqueous solution in the reaction vessel and thereby causing the oxidation reaction to proceed. In accordance with such a method, there is no possibility of the occurrence of problems as described above and the average valence of cobalt can be adjusted easily and properly to a value of not less than 2.6 and not more than 3.0.

Furthermore, the above positive electrode active material for an alkaline storage battery is preferably produced by adjusting a concentration of oxygen dissolved in the aqueous solution containing the nickel hydroxide particles to a value of not less than 1.0 mg/l and not more than 1.5×10 mg/l by using the air supplied into the aqueous solution containing the nickel hydroxide particles.

In the method which controls the valence of cobalt by supplying air (oxygen) into the aqueous solution in the reaction vessel and thereby oxidizes cobalt, the valence of cobalt can be easily adjusted by adjusting the concentration of oxygen in the aqueous solution in the reaction vessel. However, according to the result of the examination made by the present inventors, when the reaction was caused by adjusting the concentration of oxygen dissolved in the aqueous solution in the reaction vessel to a value lower than 1.0 mg/l, it was difficult to increase the average valence of cobalt to a value of not less than 2.6 and the cobalt compound layer was more likely to be delaminated from the nickel hydroxide particle. When the concentration of oxygen in the aqueous solution in the reaction vessel was increased to a value higher than 1.5× 10 mg/l, on the other hand, it was proved that the average valence of cobalt might exceed 3.0.

To prevent this, the positive electrode active material for an alkaline storage battery according to the present invention is produced by adjusting the concentration of oxygen dissolved in the aqueous solution containing the nickel hydroxide particles to a value of not less than 1.0 mg/l and not more than 1.5×10 mg/l by using the air supplied into the aqueous solution containing the nickel hydroxide particles. This allows the average valence of cobalt to be properly adjusted in a range of not less than 2.6 and not more than 3.0. As a result, the positive electrode active material is produced in which the cobalt compound layer containing cobalt having an average valence of not less than 2.6 and not more than 3.0 is properly formed on the surface of each of the nickel hydroxide particles.

According to another aspect, the present invention provides a positive electrode for an alkaline storage battery containing: a positive electrode active material for an alkaline storage battery as recited in any one of claims 1 to 10.

The positive electrode for an alkaline storage battery according to the present invention contains any of the positive electrode active materials described above. By using such a positive electrode, the output characteristic of an alkaline storage battery can be improved and the self-discharge characteristic and cycle lifetime characteristic thereof can also be improved.

Furthermore, the above positive electrodes for an alkaline storage battery, preferably, contains, in addition to the positive electrode active material: metal cobalt particles; and yttrium oxide particles.

As described above, in the positive electrode for an alkaline storage battery according to the present invention, the positive electrode active material has the cobalt compound layer with a relatively low conductivity. As a result, the current collectivity of the positive electrode becomes lower than in the case where the positive electrode active material has the cobalt compound layer with a high conductivity. To prevent this, the positive electrode for an alkaline storage battery according to the present invention contains the metal cobalt particles (powder) and the yttrium oxide particles (powder) in addition to the positive electrode active material. By causing the positive electrode to contain the metal cobalt particles (powder) with an excellent conductivity, the current collectivity of the positive electrode can be enhanced. By causing the positive electrode to further contain the yttrium oxide particles (powder), the oxygen overvoltage can be unusually increased and the charge reception performance can be improved. A conceivable reason for this is as follows.

It has been known that, by causing an electrode to contain the yttrium oxide particles (powder), the oxygen overvoltage is increased and the charge reception performance is improved. When the positive electrode is caused to contain the metal cobalt particles (powder) in addition to the yttrium oxide particles (powder) having such a property, an oxide mixture of cobalt and yttrium is generated during charging. This improves the dispersibility of yttrium oxide. Therefore, it is considered that the oxygen overvoltage is unusually increased and the charge reception performance is improved.

Furthermore, in the above positive electrode for an alkaline storage battery, preferably, the metal cobalt particles are contained at a proportion of 2 to 7 parts by weight to 100 parts by weight of the positive electrode active material.

The positive electrode for an alkaline storage battery according to the present invention contains the metal cobalt particles (powder) at a proportion of 2 to 7 parts by weight to 100 parts by weight of the positive electrode active material.

By causing the metal cobalt particles (powder) to be contained at a proportion of not less than 2 parts by weight to 100 parts by weight of the positive electrode active material, the current collectivity can be improved and the utilization ratio of the active material can be improved. By adjusting the proportion to a value of not more 7 parts by weight relative to 100 parts by weight of the positive electrode active material, the positive electrode active material can be provided in a sufficient filling amount and the positive electrode having a high capacity density can be provided.

Furthermore, in any one of the above positive electrodes for an alkaline storage battery, preferably, the yttrium oxide particles are contained at a proportion of 0.5 to 3 parts by weight to 100 parts by weight of the positive electrode active material.

The positive electrode for an alkaline storage battery according to the present invention contains the yttrium oxide particles (powder) at a proportion of 0.5 to 3 parts by weight to 100 parts by weight of the positive electrode active material. By causing the yttrium oxide particles (powder) at a proportion of not less than 0.5 parts by weight to 100 parts by weight of the positive electrode active material, the charge reception performance can be improved. Since the yttrium oxide particles (powder) are an insulator, they serve as an electric resistor in the positive electrode. When the content of the yttrium oxide particles is large, the high-rate discharge characteristic and output characteristic of the alkaline storage battery are degraded. To prevent this, in the positive electrode for an alkaline storage battery according to the present invention, the proportion of the yttrium oxide particles (powder) to 100 parts by weight of the positive electrode active material is limited to a value of not more than 3 parts by weight. This allows improvements in high-rate discharge characteristic and output characteristic.

According to another aspect, the present invention provides an alkaline storage battery comprising one of the aforementioned positive electrodes for an alkaline storage battery.

The alkaline storage battery according to the present invention comprises any of the positive electrodes for an alkaline storage battery described above. As a result, the output characteristic is improved and the self-discharge characteristic and the cycle lifetime characteristic are also improved.

According to another aspect, the present invention provides a method for manufacturing a positive electrode active material for an alkaline storage battery having nickel hydroxide particles and a cobalt compound layer coating each of the nickel hydroxide particles, the method comprising: a cobalt compound layer forming step of forming the cobalt compound layer on a surface of each of the nickel hydroxide particles by supplying an aqueous solution containing cobalt ions into an aqueous solution containing nickel hydroxide particles, while supplying an aqueous sodium hydroxide solution into the aqueous solution containing the nickel hydroxide particles to maintain the pH thereof in a range of 11.5 to 13.5 and also supplying air thereinto.

The manufacturing method according to the present invention forms the cobalt compound layer on the surface of each of the nickel hydroxide particles by supplying the aqueous solution containing the cobalt ions, while supplying the aqueous sodium hydroxide solution to maintain the pH in the range of 11.5 to 13.5. By thus maintaining the pH of the aqueous solution in the reaction vessel at a value of not less than 11.5, the crystallinity of the cobalt compound coating the surface of each of the nickel hydroxide particles can be increased. By further maintaining the pH of the aqueous solution in the reaction vessel at a value of not more than 13.5, the crystal growth of the cobalt compound can be accelerated and the possibility of the delamination of the cobalt compound layer from the nickel hydroxide particle can be reduced.

In addition, the manufacturing method according to the present invention supplies the air into the aqueous solution in the reaction vessel. This allows the oxidation reaction to proceed and allows the valence of cobalt to be controlled. As stated previously, when the method which oxidizes cobalt by using an oxidant or a thermal treatment was used, the cobalt compound layer with a high conductivity was formed so that the self-discharge of the alkaline storage battery tended to increase. To prevent this, the method according to the present invention adjusts the concentration of oxygen in the aqueous solution in the reaction vessel by supplying the air into the aqueous solution and thereby allows the average valence of cobalt to be adjusted easily and properly to a value of not less than 2.6 and not more than 3.0. As a result, it becomes possible to easily and properly suppress an increase in the conductivity of the cobalt compound layer resulting from charging and discharging and consequently improve the self-discharge characteristic of the alkaline storage battery.

Further, in the above manufacturing method for positive electrode active material for an alkaline storage battery, preferably, the cobalt compound layer forming step includes adjusting a concentration of oxygen dissolved in the aqueous solution containing the nickel hydroxide particles to a value of not less than 1.0 mg/l and not more than $1.5 \times 10$ mg/l by using the air supplied into the aqueous solution containing the nickel hydroxide particles.

As mentioned above, in the method which controls the valence of cobalt by supplying air (oxygen) into the aqueous solution in the reaction vessel and thereby oxidizes cobalt, the valence of cobalt can be easily adjusted by adjusting the concentration of oxygen in the aqueous solution in the reaction vessel. However, according to the result of the examination made by the present inventors, when the reaction was caused by adjusting the concentration of oxygen dissolved in the aqueous solution in the reaction vessel to a value lower than 1.0 mg/l, it was difficult to increase the average valence of cobalt to a value of not less than 2.6 and the cobalt compound layer was more likely to be delaminated from the nickel hydroxide particle. When the concentration of oxygen in the aqueous solution in the reaction vessel was increased to a value higher than $1.5 \times 10$ mg/l, on the other hand, it was proved that the average valence of cobalt might exceed 3.0.

To prevent this, the manufacturing method according to the present invention adjusts the concentration of oxygen dissolved in the aqueous solution containing the nickel hydroxide particles to a value of not less than 1.0 mg/l and not more than $1.5 \times 10$ mg/l by using the air supplied into the aqueous solution in the cobalt compound layer forming step. This allows the average valence of cobalt to be properly adjusted in a range of not less than 2.6 and not more than 3.0.

BEST MODE FOR CARRYING OUT THE INVENTION

Figure 1:
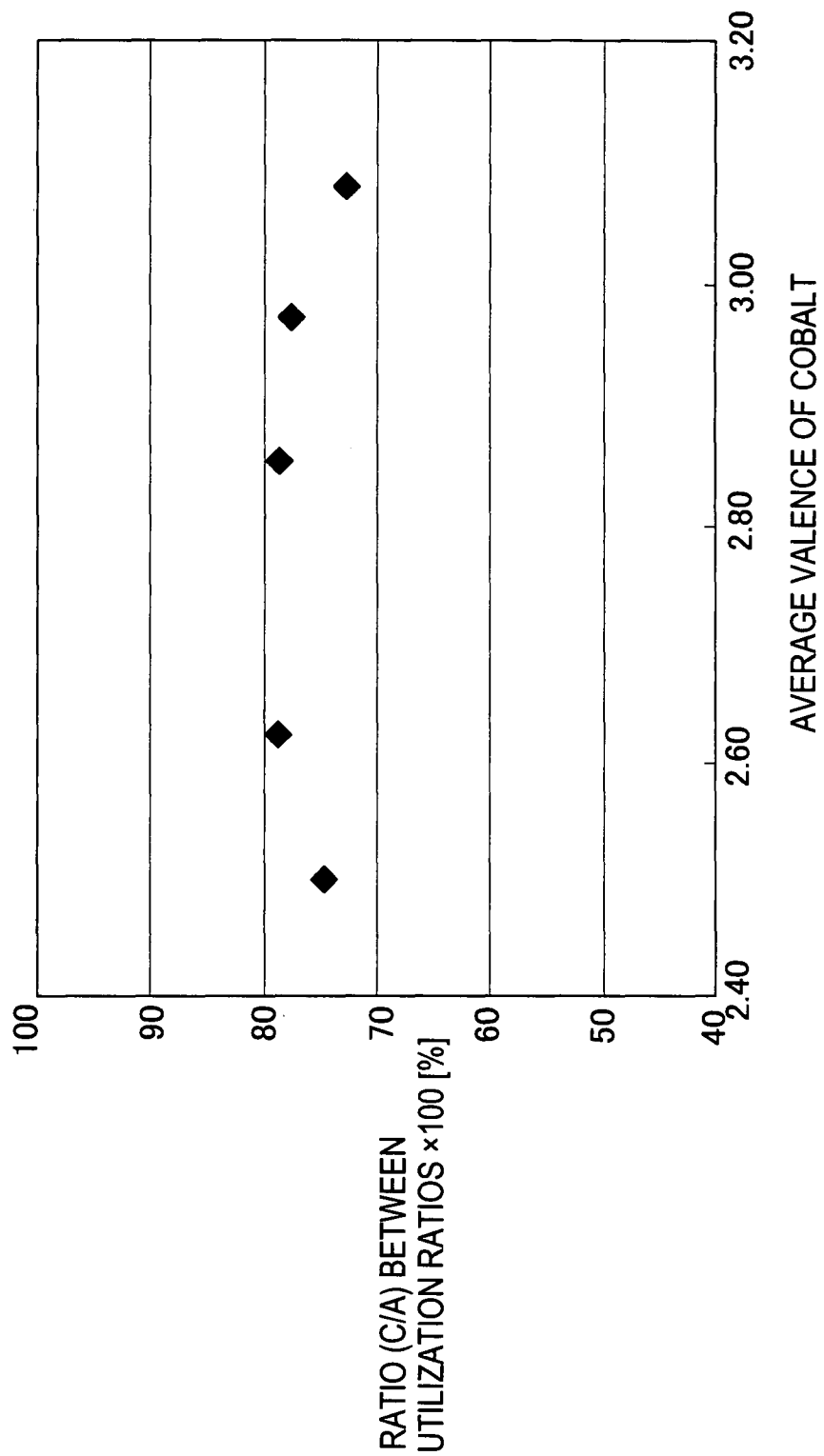
FIG. 1 is a characteristic view showing the relationship between the average valence of cobalt contained in a cobalt compound layer and the ratio (C/A) between utilization ratios×100(%) in an alkaline storage battery according to Example 2.

A description will be given next to the embodiments of the present invention.

Example 1

Step 1

Production of Nickel Hydroxide Grains

In Example 1, nickel hydroxide particles each containing magnesium in a solid solution state were produced as follows. First, a solution mixture containing nickel sulfate and magnesium sulfate, an aqueous sodium hydroxide solution, and an aqueous ammonia solution were prepared and continuously supplied at a flow rate of 0.5 ml/minute into a reactor held at 50° C. The concentration of the solution mixture containing nickel sulfate and magnesium sulfate was adjusted to 2.4 mol/l. The mixture ratio between nickel sulfate and magnesium sulfate was adjusted such that the ratio of the number of moles of magnesium to the total number of moles of nickel and magnesium was 5 mol %. The concentration of the aqueous sodium hydroxide solution was adjusted to 5.5 mol/l, while the concentration of the aqueous ammonia solution was adjusted to 6.0 mol/l.

Then, after the pH in a reaction vessel became constant at 12.5 and the balance between the respective concentrations of a metallic salt and metal hydroxide particles became constant so that a steady state was reached, a suspension that has overflown from the reaction vessel was collected and a precipitate was separated by decantation. Thereafter, the precipitate was washed with water and dried so that nickel hydroxide powder having an average particle diameter of 10 μm was obtainable.

As a result of performing composition analysis with respect to the obtained nickel hydroxide powder by using ICP emission analysis, the proportion of magnesium to all the metal elements (nickel and magnesium) contained in each of the nickel hydroxide particles was 5 mol % in the same manner as in the solution mixture used for synthesis.

As a result of recording an X-ray diffraction pattern using a CuKα beam, the pattern matched the XRD pattern reported in the JCPDS inorganic material file under the entry No: 14-177 and it was proved that each of the particles was composed of a β-Ni(OH)$_2$-type single phase. In other words, it was proved that magnesium was solid-solved in nickel hydroxide. In the X-ray diffraction pattern, the peak half width of the (101) plane located in the vicinity of 2θ=37° to 40° was 1.0°. As an X-ray diffractometer, RINT 2200 commercially available from Rigaku Co. was used. The measurement conditions were as follows.

<X-Ray Diffraction Measurement Conditions>
X-Ray: CuKα/40 kV/40 mA
Slit: DS/SS=1°, RS=0.15 mm
Scan Mode: FT Measurement
Sampling Time: 2 sec
Step Width: 0.02°

Step 2

Production of Positive Electrode Active Material

Next, a positive electrode active material was produced by forming a coating layer (hereinafter also referred to as a cobalt compound layer) made of a cobalt compound on the surface of each of the nickel hydroxide particles (hereinafter also referred to as solid-solution-magnesium-containing nickel hydroxide particles) containing magnesium in a solid solution state. Specifically, a 5.5 mol/l aqueous sodium hydroxide solution and a 2.4 mol/l aqueous cobalt sulfate solution were supplied into an aqueous solution (suspension) containing the solid-solution-magnesium-containing nickel hydroxide particles, while agitation was continued and the pH was maintained at 12.5 at 50° C. At this time, the concentration of oxygen in the aqueous solution in a reaction vessel was held constant at 3.0 mg/l by supplying air into the reaction vessel. In this manner, a cobalt compound was precipitated on the surface of each of the solid-solution-magnesium-containing nickel hydroxide particles. The coating amount of the cobalt compound was adjusted at a ratio of 10 wt % to the weight of the solid-solution-magnesium-containing nickel hydroxide particles.

Then, anions such as sulfuric acid ions were removed by performing an alkali treatment using an aqueous sodium hydroxide solution at the pH of 13 to 14 with respect to the solid-solution-magnesium-containing nickel hydroxide particles each formed with the cobalt compound layer. Thereafter, cations such as sodium ions were removed by washing with water and dried. In this manner, the positive electrode active material having an average particle diameter of 10 μm could be obtained. By adjusting conditions for the alkali treatment and washing with water, the amount of the sulfuric acid ions (sulfate group) and the amount of sodium ions each contained in the positive electrode active material were adjusted.

As a result of performing composition analysis with respect to the obtained positive electrode active material, the proportion of sodium ions contained in the cobalt compound was 0.01 wt % to the total weight of the cobalt compound. On the other hand, the proportion of the sulfate group contained in the positive electrode active material was $3.0 \times 10^{-2}$ wt % to the total weight of the positive electrode active material.

An amount of cobalt contained in the positive electrode active material was also measured by using ICP emission analysis. Further, a solution prepared by adding a hydrochloric acid to the positive electrode active material powder and potassium iodide powder was titrated with a sodium thiosulfate solution. The titration was terminated by adding a starch solution near the end point. As a result of calculating the average valence of cobalt based on the titer of the sodium thiosulfate solution at the end point and on the amount of cobalt contained in the positive electrode active material previously obtained, it was 2.85.

As a result of measuring the specific surface area of the obtained positive electrode active material by using a BET method based on nitrogen gas adsorption, it was 10.5 m$^2$/g. As a result of examining the thickness of the cobalt compound layer by observing an enlarged image of the near-edge portion of the rupture cross section of an active material particle with a TEM (transmission electronic microscope), the average thickness thereof was 0.15 μm.

As a result of measuring the conductivity of the positive electrode active material in a state pressurized at 39.2 MPa (400 kgf/cm$^2$), it was 2.5×10$^{-8}$ S/cm. Since the positive electrode active material was high in resistance, the conductivity thereof was difficult to measure by a normal dc four-terminal method. Accordingly, the measurement was performed by a double ring method based on constant voltage application (using Hiresta-UP™ commercially available from Mitsubishi Chemical Corporation).

Then, X-ray diffraction measurement using a CuKα beam was performed to examine the crystal structure of the cobalt compound layer. As a result, cobalt oxyhydroxide having a rhombo-hexagonal layered structure and a high crystallinity and reported in the JCPDS inorganic material file under the entry No: 7-169 was recognized. The peak half width of the (110) plane located in the vicinity of 2θ=64° to 67° was 0.7°. As an X-ray diffractometer, RINT 2200 commercially available from Rigaku Co. was used. The measurement conditions were as follows.

<X-Ray Diffraction Measurement Conditions>
X-Ray: CuKα/40 kV/40 mA
Slit: DS/SS=1°, RS=0.3 mm
Scan Mode: FT Measurement
Sampling Time: 9 sec
Step Width: 0.01°

Step 3

Production of Nickel Positive Electrode

Next, a nickel positive electrode was produced. Specifically, 100 g of the positive electrode active material powder obtained in Step 2, 5 g of cobalt powder, and 2 g of yttrium oxide ($Y_2O_3$) powder were mixed with each other and 27 g of water was added thereto. The resulting mixture was kneaded into a paste. The paste was filled in a foamed nickel substrate with a void ratio of 95%, dried, and pressure-molded, whereby a nickel positive electrode board was produced. Then, the nickel positive electrode board was cut into a specified size and an electrode lead was bonded by spot welding so that the nickel positive electrode with a theoretical capacity of 1300 mAh was obtainable. The theoretical capacity of the nickel positive electrode was calculated by assuming that nickel in the active material underwent a single-electron reaction.

In the positive electrode according to Example 1, 5 g of the cobalt powder was added relative to 100 g of the positive electrode active material powder, as stated previously. In other words, 5 parts by weight of cobalt was caused to be contained in 100 parts by weight of the positive electrode active material. On the other hand, 2 g of the yttrium oxide ($Y_2O_3$) powder was added to 100 g of the positive electrode active material. In addition, 2 parts by weight of yttrium oxide ($Y_2O_3$) was caused to be contained in 100 parts by weight of the positive electrode active material.

Step 4

Production of Alkali Storage Battery

Next, a negative electrode containing a hydrogen absorbing alloy was produced by a well-known method. Specifically, hydrogen absorbing alloy $MmNi_{3.55}Co_{0.75}Al_{0.3}$ powder with a particle diameter of about 25 μm was prepared and water and carboxymethyl cellulose as a binder were added thereto. The resulting mixture was kneaded into a paste. The paste was pressure-filled in an electrode support so that a hydrogen-absorbing-alloy negative electrode board was produced. The hydrogen-absorbing-alloy negative electrode board was cut into a specified size so that a negative electrode with a capacity of 2000 mAh was obtained.

Then, the negative electrode and the positive electrode described above were rolled up with a separator composed of a sulfonated polypropylene non-woven fabric having a thickness of 0.15 mm interposed therebetween, thereby forming spiral electrodes. Subsequently, the electrodes were inserted into a bottomed cylindrical battery container made of a metal, which had been prepared separately, and 2.2 ml of a 7 mol/l aqueous potassium hydroxide solution was injected therein. Thereafter, the opening of the battery container was tightly closed with a sealing plate having a safety valve with a working pressure of 2.0 MPa, whereby a cylindrical closed nickel-metal hydride storage battery of the AA size was produced.

Comparative Example 1

Next, an alkaline storage battery which is different from the alkaline storage battery according to Example 1 described above only in the method for producing the positive electrode active material in Step 2 was produced. Specifically, in Step 2, a cobalt compound layer was formed on the surfaces of each of the solid-solution-magnesium-containing nickel hydroxide particles without supplying air into the reaction vessel. Then, the average valence of cobalt was examined and X-ray diffraction measurement was performed each in the same manner as in Example 1, with the result that the cobalt compound layer according to Comparative Example 1 was a coating layer primarily containing cobalt hydroxide.

Then, a modification treatment was performed with respect to the nickel hydroxide powder formed with the cobalt compound coating layer as follows. First, the powder was impregnated with 40 wt % of an aqueous sodium hydroxide solution as an oxidation adjuvant. Thereafter, the powder was loaded in a drier having a microwave heating function and heated to be completely dried, while oxygen was supplied into the drier. As a result, the cobalt compound coating layer on the surface of each of the particles was oxidized and changed into indigo color. Subsequently, the obtained powder was washed with water and vacuum dried so that a positive electrode active material according to Comparative Example 1 was obtained.

As a result of calculating the average valence of cobalt contained in the cobalt compound layer in the same manner as in Example 1, it was 3.2. As a result of composition analysis, the amount of sodium in the cobalt compound showed a value of 3.3 wt %. Since such a high sodium content was shown in Comparative Example 1, it can be assumed that sodium was captured in the crystal of the cobalt compound and could not be removed by washing with water. As a result of measuring the conductivity of the positive electrode active material in a state pressurized at 39.2 MPa (400 kgf/cm$^2$), it showed a value of 3.2×10$^{-2}$ S/cm. This proved that the formed cobalt compound layer was high in conductivity. Thereafter, the alkaline storage battery was produced by the same procedures as in Steps 3 and 4 of Example 1.

Comparative Example 2

Next, an alkaline storage battery which is different from the alkaline storage battery according to Example 1 described above only in the procedure in Step 1 was produced. Specifically, an aqueous solution only of nickel sulfate was supplied in Comparative Example 2 without causing magnesium sulfate to be contained, in contrast to Example 1 in which the solution mixture containing nickel sulfate and magnesium sulfate was supplied into the reaction vessel in Step 1. As a result, pure nickel hydroxide powder not containing magnesium was obtained. Thereafter, an alkaline storage battery was produced by the same procedures as in Steps 2 to 4 of Example 1.

(Evaluation of Battery Characteristics)

Next, characteristic evaluation was performed with respect to each of the alkaline storage batteries according to Example 1 and Comparatives Examples 1 and 2.

First, a charge/discharge cycle in which each of the batteries was charged with a current of 130 mA at 20° C. for 15 hours and then discharged to release a current of 260 mA till the battery voltage became 1.0 V was repeatedly performed till the discharge capacity was stabilized. Then, after the discharge capacity was stabilized, each of the batteries was charged with a current of 1.3 A at 20° C. for 1.2 hours and then discharged to release a current of 1.3 A till the battery voltage became 0.8 V. Based on the discharge capacity obtained at that time, an active-material utilization ratio A (utilization ratio during 1.3 A discharge) was calculated for each of the batteries. Further, each of the batteries was charged with a current of 1.3 A at 20° C. for 1.2 hours and then discharged to release a current of 6.5 A till the battery voltage became 0.8 V. Based on the discharge capacity obtained at that time, an active-material utilization ratio B (utilization ratio during 6.5 A discharge) was calculated for each of the batteries. The active-material utilization ratios A and B were calculated herein relative to a theoretical amount of electricity when nickel in the active material underwent a single-electron reaction. Specifically, the ratio of the discharge capacity to 1300 mAh as the theoretical capacity of the positive electrode was shown. As an index showing the high-rate discharge characteristic of each of the batteries, the ratio (B/A) of the active-material utilization ratio B to the active-material utilization ratio A×100(%) was calculated.

Next, each of the batteries was charged with a current of 1.3 A at 20° C. for 1.2 hours, allowed to stand for 2 weeks in an atmosphere at 45° C., and then discharged to release a current of 1.3 A till the battery voltage became 0.8 V. Based on the discharge capacity obtained at that time, an active-material utilization ratio C (residual utilization ratio after 2 weeks at 45° C.) was calculated for each of the batteries. Based on the result of calculation, the ratio (C/A) of the active-material utilization ratio C to the active-material utilization ratio A×100(%) was calculated as an index showing the self-discharge characteristic of each of the batteries. The active-material utilization ratio C was also calculated relative to a theoretical amount of electricity when nickel in the active material underwent a single-electron reaction.

Further, a charge/discharge cycle in which each of the batteries was charged with a current of 1.3 A at 20° C. for 1.2 hours and then discharged to release a current of 1.3 A till the battery voltage became 0.8 V was performed 200 times. Then, based on the discharge capacity in the 200-th cycle, an active-material utilization ratio D (utilization ratio after 200 cycles) was calculated for each of the batteries. Based on the result of calculation, the ratio (D/A) of the active-material utilization ratio D to the active-material utilization ratio A×100(%) was calculated as an index showing the cycle lifetime characteristic of each of the batteries. The active-material utilization ratio D was also calculated relative to a theoretical amount of electricity when nickel in the active material underwent a single-electron reaction.

The results of the characteristic evaluation are shown in Table 1.

TABLE 1

|  | High-Rate Discharge Characteristic (B/A) × 100(%) | Self-Discharge Characteristic (C/A) × 100(%) | Cycle Lifetime Characteristic (D/A) × 100(%) |
| --- | --- | --- | --- |
| Example 1 | 94.7 | 78.9 | 94.7 |
| Comparative Example 1 | 94.8 | 67.0 | 89.7 |
| Comparative Example 2 | 89.5 | 81.1 | 80.0 |

The results of the characteristic evaluation of the individual batteries will be comparatively examined herein below.

First, comparisons will be made among the high-rate discharge characteristics. Example 1 and Comparative Example 1 showed high-rate discharge characteristic values of 94.7% to 94.8%, which were on the same order, so that each of them was excellent in high-rate discharge characteristic. By contrast, the high-rate discharge characteristic of Comparative Example 2 showed a value of 89.5% and was inferior to that of each of Example 1 and Comparative Example 1. A conceivable reason for the high-rate discharge characteristic of each of the alkaline storage batteries according to Example 1 and Comparative Example 1 which was more excellent than that of the alkaline storage battery according to Comparative Example 2 is that, by using nickel hydroxide containing magnesium in a solid solution state for the positive electrode active material, the intrinsic electron conductivity of the positive electrode active material was increased.

Next, comparisons will be made among the self-discharge characteristics. Example 1 and Comparative Example 2 showed self-discharge characteristic values of 78.9% and 81.8%, which were on the same order, so that each of them was excellent in self-discharge characteristic. In Comparative 1, by contrast, the ratio between utilization ratios showing the self-discharge characteristic was 67.0% so that the self-discharge characteristic of Comparative Example 1 was considerably inferior to that of each of Example 1 and Comparative Example 2. A conceivable reason for the self-discharge characteristic of each of the alkaline storage batteries according to Example 1 and Comparative Example 2 which was more excellent than that of the alkaline storage battery according to Comparative Example 1 is as follows.

In Comparative Example 1, in the production of the cobalt compound layer, the nickel hydroxide powder was impregnated with 40 wt % of the aqueous sodium hydroxide solution as an oxidation adjuvant and then heated, while oxygen was supplied thereto, so that an oxidation reaction was caused to proceed. As a result, the average valence of cobalt contained in the cobalt compound layer became as high as 3.2 and 3.3 wt % of sodium was contained in the crystal of the cobalt compound. This increased the conductivity of the cobalt compound layer so that the conductivity thereof in a state pressurized at 39.2 MPa (400 kgf/cm$^2$) was as high as $3.2 \times 10^{-2}$ S/cm. When the conductivity of the cobalt compound layer is thus increased, the reactivity in the vicinity of the surface of nickel hydroxide significantly increases so that the depth of charge is presumably increased locally. Since a portion at such a locally increased depth of charge is at a high potential, it preferentially entailed an oxygen-generating reaction so that a self-discharge reaction proceeded conceivably.

By contrast, in the production of each of the cobalt compound layers in Example 1 and Comparative Example 2, the oxidation reaction was caused to proceed by supplying the air into the reaction vessel. This allowed the proportion of sodium ions contained in the cobalt compound to be reduced to an extremely small value of 0.01 wt % relative to the total weight of the cobalt compound and also allowed the average valence of cobalt to be reduced to a small value of 2.85. As a result, the conductivity of the cobalt compound layer was reduced so that the conductivity thereof in a state pressurized at 39.2 MPa (400 kgf/cm$^2$) was as small as $2.5 \times 10^{-8}$ S/cm. It is considered that, by thus reducing the electron conductivity of the cobalt compound in contact with the surface of each of the nickel hydroxide particles, the depths of charge of the nickel hydroxide particles were generally evened and the self-discharge could be suppressed.

Next, comparisons will be made among the cycle lifetime characteristics. The alkaline storage battery according to Example 1 showed a high cycle lifetime characteristic value of 94.7% so that it was excellent in cycle lifetime characteristic. In Comparative Example 1, by contrast, the cycle lifetime characteristic showed a preferable value of 89.7% but was slightly inferior to that in Example 1. In Comparative Example 2, the cycle lifetime characteristic showed a value of 80.0% and was further inferior.

A conceivable reason for the cycle lifetime characteristic of the alkaline storage battery according to Example 1 which was more excellent than that of the alkaline storage battery according to Comparative Example 1 is that, by suppressing the self-discharge as described above, the reduction reaction of the cobalt compound could be suppressed. A conceivable reason for the cycle lifetime characteristic of the alkaline storage battery according to Example 1 which was more excellent than that of the alkaline storage battery according to Comparative Example 2 is that, by causing magnesium to be solid-solved in nickel hydroxide, the generation of a γ-phase (γ-NiOOH) during over-charging could be suppressed.

Example 2

In Example 2, the average valence of cobalt contained in the cobalt compound layer was varied by adjusting the concentration of oxygen in the aqueous solution in the reaction vessel in Step 2. Specifically, five types of positive electrode active materials were produced by adjusting the concentration of dissolved oxygen in the reaction vessel to five different values of 0.5, 1.0, 3.0, 15.0, and 17.0 (mg/l) by varying the flow rate of the air supplied into the reaction vessel and adjusting the other conditions in the same manner as in Example 1.

As a result of examining the physical properties of the five types of positive electrode active materials in the same manner as in Example 1, the average valences of cobalt in the cobalt compounds were 2.50, 2.62, 2.85, 2.97, and 3.08. The amount of sodium in each of the cobalt compounds showed a value smaller than 1 wt % relative to the total weight of the cobalt compound. The conductivity of each of the cobalt compounds showed a value smaller than $1.0 \times 10^{-5}$ S/cm.

In Example 2, five types of alkaline storage batteries were produced in exactly the same manner as in Example 1 except that the concentration of dissolved oxygen was varied in Step 2. Characteristic evaluation was performed with respect to each of the five types of alkaline storage batteries in the same manner as in Example 1 so that the ratio (C/A) of the active-material utilization ratio C to the active-material utilization ratio A×100(%) was calculated and used as the index showing the self-discharge characteristic. FIG. 1 shows the relationship between the average valence of cobalt contained in each of the cobalt compound layers and the ratio (C/A) between utilization ratios×100(%).

From FIG. 1, it can be seen that the ratios (C/A) between utilization ratios×100(%) show high values in the range in which the average valences of cobalt contained in the cobalt compound layers are not less than 2.6 and not more than 3.0. Therefore, by adjusting the average valence of cobalt contained in each of the cobalt compound layers to a value of not less than 2.6 and not more than 3.0, the self-discharge characteristic can be improved.

It can be said that, to adjust the average valence of cobalt to a value of not less than 2.6 and not more than 3.0, it is necessary to adjust the concentration of dissolved oxygen in the reaction vessel to a value of not less than 1.0 mg/l and not more than 15.0 mg/l.

Example 3

In Example 3, five types of positive electrode active materials were produced by varying the number of alkali treatments and the number of washings with water in Step 2 to vary the amount of sodium contained in the cobalt compound layer and adjusting the other conditions in the same manner as in Example 1.

As a result of examining the physical properties of the five types of positive electrode active materials in the same manner as in Example 1, the amounts of sodium in the cobalt compounds were 0.01, 0.05, 0.10, 0.18, and 0.31 (wt %) relative to the total weights of the cobalt compounds. The conductivity of each of the cobalt compounds showed a value smaller than $1.0 \times 10^{-5}$ S/cm.

Figure 2:
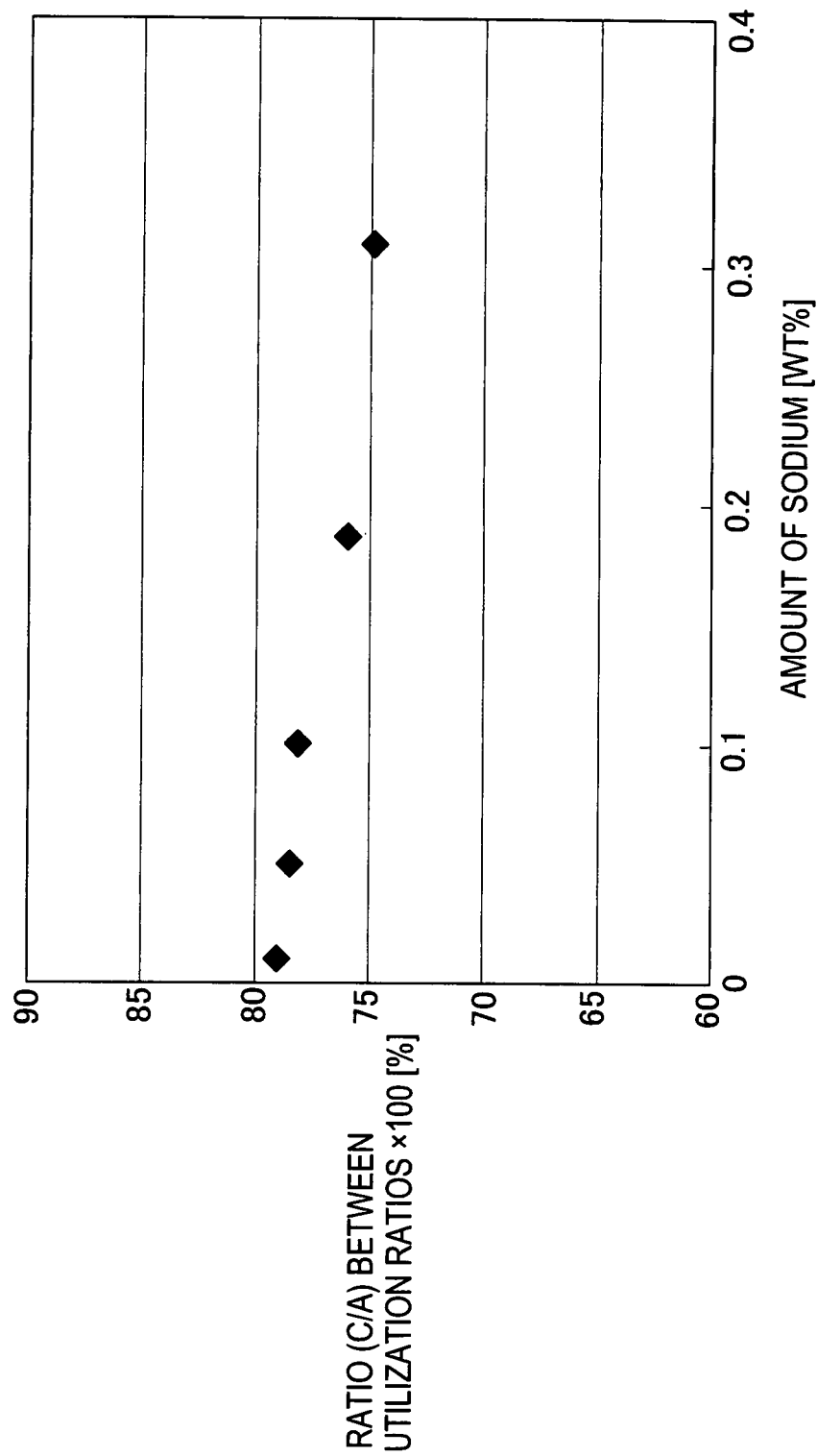
FIG. 2 is a characteristic view showing the relationship between the amount of sodium contained in a cobalt compound layer and the ratio (C/A) between utilization ratios× 100(%) in an alkaline storage battery according to Example 3.

In Example 3, five types of alkaline storage batteries were produced in exactly the same manner as in Example 1 except that the number of alkali treatments and the number of washings with water were varied in Step 2. Characteristic evaluation was performed with respect to each of the five types of alkaline storage batteries in the same manner as in Example 1 so that the ratio (C/A) of the active-material utilization ratio C to the active-material utilization ratio A×100(%) was calculated and used as the index showing the self-discharge characteristic. FIG. 2 shows the relationship between the amount (wt %) of sodium contained in each of the cobalt compound layers and the ratio (C/A) between utilization ratios×100(%).

From FIG. 2, it can be seen that the ratios (C/A) between utilization ratios×100(%) show high values in the range in which the amounts of sodium contained in the cobalt compound layers are less than 0.10 wt %. Therefore, by adjusting the amount of sodium contained in each of the cobalt compound layers to a value of less than 0.10 wt %, the self-discharge characteristic can be improved.

Example 4

In Example 4, the average valence of cobalt contained in the cobalt compound layer was adjusted by adding an oxidant, further performing a thermal treatment, and thereby causing an oxidation reaction to proceed without supplying air into the reaction vessel in Step 2. Five types of positive electrode active materials (designated as Samples 1 to 5) were produced by adjusting the other conditions in exactly the same manner as in Example 1. As a result of examining the physical properties of these positive electrode active materials in the same manner as in Example 1, the average valences of cobalt in the cobalt compounds were in the range of 2.8 to 3.0. The amount of sodium in each of the cobalt compounds showed a value smaller than 0.1 wt %. The conductivities of the cobalt compounds showed respective values of $2.5 \times 10^{-8}$, $9.6 \times 10^{-7}$, $9.8 \times 10^{-6}$, $1.4 \times 10^{-5}$, and $8.3 \times 10^{-5}$ (S/cm), in this order.

In Example 2 described above, the average valences of cobalt could be adjusted in the range of 2.6 to 3.0 by adjusting the average valences of cobalt by using the method which supplied the air into the reaction vessel (see FIG. 1). In Example 4, by contrast, the average valences of cobalt were in the range of 2.8 to 3.0 and it was not easy to adjust the average valences of cobalt to low values. From the result, the average valences of cobalt can be adjusted more properly in a range of not less than 2.6 and not more than 3.0 by using the method which supplied the air into the reaction vessel than by using the method which adjusts the amount of the oxidant to be added and the conditions for the thermal treatment as the method for adjusting the average valences of cobalt.

Next, the crystal structure of each of the cobalt compound layers of Samples 1 to 5 was examined by performing X-ray diffraction measurement using a CuKα beam with respect to each of Samples 1 to 5 in the same manner as in Example 1. As a result, cobalt oxyhydroxide reported in the JCPDS inorganic material file under the entry No: 7-169 was recognized in each of Samples 1 to 5. As a result of examining the peak half width of the (110) plane located in the vicinity of $2\theta=64°$ to $67°$ for each of Samples 1 to 5, the peak half widths were 0.70°, 0.97°, 1.50°, 1.54°, and 1.78° in the order of sample numbers and varied in the range of 1.0° to 1.8° (see Table 2).

The peak half width of the (110) plane located in the vicinity of $2\theta=64°$ to $67°$ in the X-ray diffraction using the CuKα beam represents the peak of cobalt oxyhydroxide (see the entry No: 7-169 in the JCPDS inorganic material file). By selecting the peak of the (110) plane located in the vicinity of $2\theta=64°$ to $67°$, the peak of cobalt oxyhydroxide can be properly sensed with no overlap between the respective peaks of nickel hydroxide and cobalt oxyhydroxide contained in each of Samples 1 to 5.

In Example 4, five types of alkaline storage batteries were produced in exactly the same manner as in Example 1 except that the method for adjusting the average valence of cobalt in Step 2 was changed. Characteristic evaluation was performed with respect to each of the five types of alkaline storage batteries in the same manner as in Example 1 so that the ratio (C/A) of the active-material utilization ratio C to the active-material utilization ratio A×100(%) was calculated and used as the index showing the self-discharge characteristic. The results of characteristic evaluation of the five types of alkaline storage batteries using Samples 1 to 5 are shown in Table 2.

TABLE 2

|  | Conductivity (S/cm) | Peak Half Width (°) | Self-Discharge Characteristic (C/A) × 100(%) |
| --- | --- | --- | --- |
| Sample 1 | $2.5 \times 10^{-8}$ | 0.70 | 78.9 |
| Sample 2 | $9.6 \times 10^{-7}$ | 0.97 | 78.9 |
| Sample 3 | $9.8 \times 10^{-6}$ | 1.50 | 78.7 |
| Sample 4 | $1.4 \times 10^{-5}$ | 1.54 | 76.6 |
| Sample 5 | $8.3 \times 10^{-5}$ | 1.78 | 75.3 |

As shown in Table 2, a correlation was observed between the conductivity and the peak half width and the tendency of the half width to increase as the conductivity was higher was recognized (In Example 4, the conductivity and the peak half width increased in the order of the sample numbers). As a result of making comparisons among the self-discharge characteristics of Samples 1 to 5, the ratios (C/A) between utilization ratios×100 of Samples 1 to 3 showed equal values of 78.9, 78.9, and 78.7(%) in this order so that the relatively excellent self-discharge characteristics were obtainable. By contrast, the ratios (C/A) between utilization ratios×100 of Samples 4 and 5 showed values of 76.6 and 75.3(%) in this order so that the self-discharge characteristics were slightly inferior to those of Samples 1 to 3.

From the results, by adjusting the conductivity of each of the positive electrode active materials in a state pressurized at 39.2 MPa (400 kgf/cm²) to a value smaller than $1.0 \times 10^{-5}$ S/cm, the self-discharge characteristic can be improved. It can also be said that, by causing the crystal structure of each of the cobalt compound layers to primarily contain cobalt oxyhydroxide with a high crystallinity and further adjusting the peak half width located in the vicinity of $2\theta=64°$ to $67°$ in the X-ray diffraction using the CuKα beam to a value of not more than 1.5°, the self-discharge characteristic can be improved.

A conceivable reason for the presence of the correlation between the conductivity and the peak half width is as follows. As the peak half width is larger, the crystal size is smaller and a larger number of crystallite interfaces are formed. Since the crystallite interfaces function as electron conducting surfaces, it is considered that the conductivity is higher as the peak half width is larger. As described also in Example 1, the depths of charge vary greatly with the nickel hydroxide particles each preliminarily provided with the cobalt compound layer having a high conductivity so that self-discharge is accelerated and the self-discharge characteristic deteriorates. Accordingly, to improve the self-discharge characteristic, the conductivity is preferably adjusted to be smaller than $1.0 \times 10^{-5}$ S/cm and the peak half width is preferably adjusted to be not more than 1.5°.

In addition, the average valence of cobalt was controlled in Example 4 by adding the oxidant and performing the thermal treatment, not by a method which supplies air as used in Example 1. In the method which adds the oxidant and performs the thermal treatment, however, the crystallinity of the cobalt compound composing the cobalt compound layer tended to lower (the peak half width tended to increase), as shown in Table 2. Because the oxidation reaction rapidly proceeds, it was difficult to stably mass-produce a positive electrode active material of which the conductivity is smaller than $1.0 \times 10^{-5}$ S/cm and a peak half width is 1.5° or less. Therefore, the method which supplies the air into the reaction vessel was preferably used as the method for controlling the average valence of cobalt.

Example 5

In Example 5, the proportion (mol %) of magnesium to all the metal elements (which are nickel and magnesium in Example 5) contained in each of the nickel hydroxide particles was adjusted by varying the mixing ratio between nickel sulfate and magnesium sulfate in Step 1. By adjusting the other conditions in exactly the same manner as in Example 1, five types of nickel hydroxide particles were produced.

As a result of examining the physical properties of the nickel hydroxide particles in the same manner as in Example 1, the individual contents of magnesium were 1.0, 2.0, 5.0, 10.0, and 12.0 (mol %). As a result of recording X-ray diffraction patterns using a CuKα beam, it could be proved that each of the patterns was of a β-Ni(OH)$_2$-type single-phase crystal. In other words, in each of the nickel hydroxide particles, magnesium was solid-solved in nickel hydroxide. As a result of examining the peak half widths of the (101) planes located in the vicinity of $2\theta=37°$ to $40°$ in the X-ray diffraction patterns, each of the peak half widths was in a range of more than 0.7° and not more than 1.2°.

Next, five types of positive electrode active materials were produced in the same manner as in Step 2 of Example 1. As a result of examining the physical properties of the positive electrode active materials in the same manner as in Example 1, the average valences of cobalt in the cobalt compounds were in the range of 2.7 to 2.9. The amount of sodium in each of the cobalt compounds showed a value smaller than 0.05 wt % relative to the total weight of the cobalt compound. The conductivity of each of the positive electrode active materials showed a value smaller than $1.0 \times 10^{-7}$ (S/cm).

Figure 3:
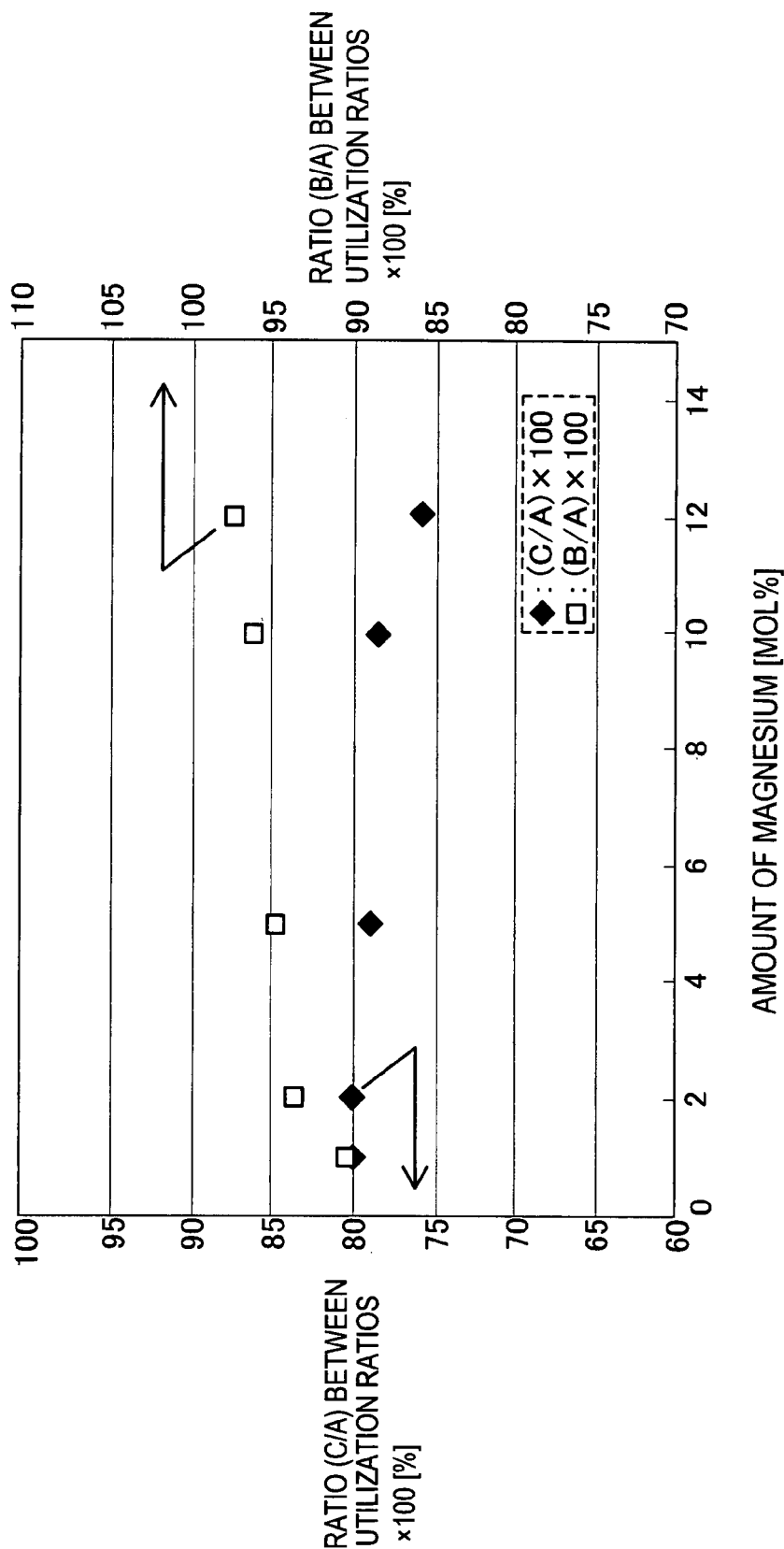
FIG. 3 is a characteristic view showing the relationships among the amount of magnesium contained in nickel hydroxide, the ratio (C/A) between utilization ratios×100(%), and the ratio (B/A) between utilization ratios×100(%) in an alkaline storage battery according to Example 5.

Next, in the same manner as in Steps 3 and 4 of Example 5, five types of alkaline storage batteries were produced. Characteristic evaluation was performed with respect to each of the five types of alkaline storage batteries in the same manner as in Example 1. In Example 5, the ratio (B/A) of the active-material utilization ratio B to the active-material utilization ratio A×100(%) was calculated as the index showing the high-rate discharge characteristic and the ratio (C/A) of the active-material utilization ratio C to the active-material utilization ratio A×100(%) was further calculated as the index showing the self-discharge characteristic. FIG. 3 shows the relationships among the amount of magnesium contained in nickel hydroxide, the ratio (C/A) between utilization ratios×100(%), and the ratio (B/A) between utilization ratios×100 (%).

As indicated by □ in FIG. 3, the ratio (B/A) between utilization ratios×100(%) shows high values in the range in which the amounts of magnesium contained in nickel hydroxide are not less than 2.0 mol %. In other words, by adjusting the amount of magnesium contained in nickel hydroxide to a value of not less than 2.0 mol %, the high-rate discharge characteristic can be improved. As also indicated by ♦ in FIG. 3, the ratio (C/A) between utilization ratios×100(%) shows high values in the range in which the amounts of magnesium contained in nickel hydroxide are not more than 10.0 mol %. In other words, by adjusting the amount of magnesium contained in nickel hydroxide to a value of not more than 10.0 mol %, the self-discharge characteristic can be improved.

Example 6

In Example 6, the proportion of the sulfate group contained in the positive electrode active material was adjusted by varying the number of alkali treatments and the number of washings with water in Step 2. Five types of positive electrode active materials were produced by adjusting the other conditions in the same manner as in Example 1.

As a result of examining the physical properties of the five types of positive electrode active materials in the same manner as in Example 1, the proportions of the sulfate groups contained in the positive electrode active materials varied in the range of 0.2 wt % to 1.1 wt %. The average valences of cobalt in the cobalt compounds were in the range of 2.6 to 3.0. The amount of sodium in each of the cobalt compounds was smaller than 0.10 wt %. The conductivity of each of the positive electrode active materials showed a value smaller than $1.0 \times 10^{-5}$ S/cm.

In Example 6, five types of alkaline storage batteries were produced in the same manner as in Example 1 except that the number of alkali treatments and the number of washings with water were varied in Step 2. Characteristic evaluation was performed with respect to each of the five types of alkaline storage batteries in the same manner as in Example 1 so that the ratio (C/A) of the active-material utilization ratio C to the active-material utilization ratio A×100(%) was calculated and used as the index showing the self-discharge characteristic.

In addition, a charge/discharge cycle in which each of the batteries was charged with a current of 1.3 A at 20° C. for 1.2 hours and then discharged to release a current of 1.3 A till the battery voltage became 0.8 V was performed 200 times. Then, based on the discharge capacity in the 200-th cycle, the active-material utilization ratio D (utilization ratio after 200 cycles) was calculated for each of the batteries. Thereafter, each of the batteries was charged with a current of 1.3 A at 20° C. for 1.2 hours, allowed to stand for 2 weeks in an atmosphere at 45° C., and then discharged to release a current of 1.3 A till the battery voltage became 0.8 V. Based on the discharge capacity obtained at that time, an active-material utilization ratio E (residual utilization ratio after 200 cycles and 2 weeks at 45° C.) was calculated for each of the batteries. Then, the ratio (E/D) of the active-material utilization ratio E to the active-material utilization ratio D×100(%) was calculated and used as an index showing a self-discharge characteristic after an endurance test.

As a result, each of the values of the ratio (C/A) between utilization ratios×100 was in the range of 77 to 79(%) and there was substantially no difference therebetween. Thus, differences in the proportions (wt %) of the sulfate groups contained in the positive electrode active materials produced substantially no difference in the initial self-discharge characteristics. However, the differences in the proportions (wt %) of the sulfate groups contained in the positive electrode active materials produced differences in the values of the ratio (E/D) between utilization ratios×100. Specifically, in the batteries in which the proportions of the sulfate groups were not more than 1.0 wt %, values (76 to 77%) substantially equal to the values of the ratio (C/A) between utilization ratios×100 could be maintained. In the battery in which the proportion of the sulfate group was over 1.0 wt %, however, a value lowered to 70% or less. From the foregoing results, by adjusting the proportion of the sulfate group contained in the positive electrode active material to a value of not more than 1.0 wt %, an excellent self-discharge characteristic can be retained over a long period of time.

Example 7

In Example 7, the pH in the reaction vessel was adjusted in the range of 12.0 to 13.5 by varying the concentration of the aqueous ammonia solution in the range of 5.5 to 6.5 mol/l and varying the concentration of sodium hydroxide in the range of 5.0 to 6.0 mol/l. By adjusting the other conditions in exactly the same manner as in Example 1, five types of nickel hydroxide particles were produced.

As a result of recording X-ray diffraction patterns using a CuKα beam in the same manner as in Example 1, it could be proved that each of the patterns was of a β-Ni(OH)$_2$-type single-phase crystal. In other words, in each of the nickel hydroxide particles, magnesium was solid-solved in nickel hydroxide. As a result of examining the peak half width of the (101) plane located in the vicinity of 2θ=37° to 40° in each of the X-ray diffraction patterns, the peak half widths varied in the range of 0.5° to 1.4°.

Next, five types of positive electrode active materials were produced in the same manner as in Step 2 of Example 1. As a result of examining the physical properties of the positive electrode active materials in the same manner as in Example 1, the average valences of cobalt in the cobalt compounds were in the range of 2.7 to 2.9. The amount of sodium in each of the cobalt compounds was smaller than 0.07 wt % relative to the total weight of the cobalt compound. The conductivity of each of the positive electrode active materials showed a value smaller than $1.0 \times 10^{-7}$ (S/cm).

Next, in the same manner as in Steps 3 and 4 of Example 1, five types of alkaline storage batteries were produced and characteristic evaluation was performed. In Example 7, the relationship between the peak half width of the (101) plane of each of the nickel hydroxide particles and the ratio (B/A) between utilization ratios×100(%) was examined. As a result, in the batteries using the nickel hydroxide particles in each of which the peak half width of the (101) plane was not more than 0.7°, the values of the ratios (B/A) between utilization ratios×100(%) were lower by about 2% than those of the batteries in each of which the peak half width of the (101) plane was larger than 0.7°. Specifically, the value of the ratio (B/A) between utilization ratios×100(%) was not less than 94% in each of the batteries in which the peak half width of the (101) plane was larger than 0.7°, while it was not more than 92% in each of the batteries in which the peak half width of the (101) plane was smaller than 0.7°. From the result, by using nickel hydroxide particles in each of which the peak half width of the (101) plane is larger than 0.7°, an excellent high-rate discharge characteristic is obtainable.

In nickel hydroxide particles in each of which the peak half width of the (101) plane was larger than 1.2°, the tap density thereof was under 1.7 g/cc and the filling density relative to the positive electrode was reduced undesirably. Specifically, in the batteries using the nickel hydroxide particles in each of which the peak half width of the (101) plane is larger than 1.2°, the capacity densities of the positive electrodes were under 500 mAh/cc and a sufficient capacity density could not be obtained. From the result, to obtain a sufficiently high capacity density, the nickel hydroxide particles in each of which the peak half width of the (101) plane is not more than 1.2° are preferably used.

Example 8

In Example 8, five types of nickel hydroxide particles were produced by adjusting the supplied amount of each of the solution mixture containing nickel sulfate and magnesium sulfate, the aqueous sodium hydroxide solution, and the aqueous ammonia solution in the range of 0.1 to 1.0 (ml/minute), while adjusting the residence time (reaction time) thereof in the reaction vessel.

Thereafter, the positive electrode active materials were produced in the same manner as in Step 2 of Example 1. As a result of examining the physical properties of the positive electrode active materials in the same manner as in Example 1, the average valences of cobalt in the cobalt compounds were in the range of 2.8 to 3.0. The amount of sodium in each of the cobalt compounds was less than 0.1 wt % relative to the total weight of the cobalt compound. The conductivity of each of the positive electrode active materials showed a value smaller than $1.0 \times 10^{-5}$ S/cm. As a result of examining the BET specific surface areas measured by a nitrogen gas adsorption method, they varied in the range of 7.0 to $2.3 \times 10$ ($m^2/g$).

Next, five types of alkaline storage batteries were produced and characteristic evaluation was performed in the same manner as in Steps 3 and 4 of Example 1. In Example 8, the relationships among the BET specific surface area ($m^2/g$) of each of the positive electrode active material particles, the ratio (B/A) between utilization ratios×100(%), and the ratio (D/A) between utilization ratios×100(%) were examined. As a result, in each of the batteries in which the BET specific surface area was smaller than 8.0 ($m^2/g$), polarization during charging and discharging was enlarged so that the value of the ratio (B/A) between utilization ratios×100(%) was lower by 2% or more than that in each of the batteries in which the BET specific surface area was not less than 8.0 ($m^2/g$). Specifically, the value of the ratio (B/A) between utilization ratios×100(%) was not less than 94% in each of the batteries using the positive electrode active material particles each having a BET specific surface area of not less than 8.0 ($m^2/g$). By contrast, the value of the ratio (B/A) between utilization ratios×100(%) was not more than 92% in each of the batteries using the positive electrode active material particles each having a BET specific surface area smaller than 8.0 ($m^2/g$). From the results, by using a positive electrode active material having a specific surface area of not less than 8.0 $m^2/g$, an excellent high-rate discharge characteristic is obtainable.

On the other hand, in each of the batteries in which the BET specific surface area was larger than $1.8 \times 10$ ($m^2/g$), the value of the ratio (D/A) between utilization ratios×100(%) was lower by 3% or more than that in each of the batteries in which the BET specific surface area was not more than 1.8 ($m^2/g$). Specifically, the value of the ratio (D/A) between utilization ratios×100(%) was not less than 94% in each of the batteries using the positive electrode active material particles each having a BET specific surface area of not more than $1.8 \times 10$ ($m^2/g$). By contrast, the value of the ratio (D/A) between utilization ratios×100(%) was not more than 91% in each of the batteries using the positive electrode active material particles each having a BET specific surface area larger than $1.8 \times 10$ ($m^2/g$). A conceivable reason for this is that, because the specific surface area of the positive electrode active material was large, the electrolyte in the separator was more likely to move into the positive electrode during the charge/discharge cycle test so that the electrolyte in the separator was reduced and the internal resistance was undesirably increased.

From the results, by using a positive electrode active material having a specific surface area of not more than $1.8 \times 10$ ($m^2/g$), the cycle lifetime characteristic can be improved.

Example 9

In Example 9, a nickel positive electrode was produced by adding 5 g of cobalt hydroxide powder instead of adding 5 g of the cobalt powder in Step 3. An alkaline storage battery was produced by adjusting the other conditions (Steps 1 to 4) in exactly the same manner as in Example 1.

Then, characteristic evaluation was performed with respect to the battery in the same manner as in Example 1, with the result that each of the high-rate discharge characteristic, the self-discharge characteristic, and the cycle lifetime characteristic was excellent.

In the alkaline storage battery according to Example 9, however, the ratio (B/A) between utilization ratios×100(%) showed an excellent value of 92.4% but was lower by 2.3% than that in the alkaline storage battery (the ratio (B/A) between utilization ratios×100=94.7%) according to Example 1. As a result of examining the internal resistance of each of the two batteries, the internal resistance of the battery according to Example 9 was slightly higher than that of the battery according to Example 1.

As a result of making a comparison between the charge/discharge curves of the two batteries during initial charging, the cobalt oxidation efficiency of Example 9 was significantly lower than that of Example 1. A conceivable reason for this is that cobalt hydroxide having a low conductivity was added to the positive electrode in Example 9, in contrast to example 1 in which cobalt having a high conductivity was added thereto. It is to be noted that the cobalt oxidation efficiency is the ratio between the amount of electricity required by cobalt and cobalt hydroxide to be changed into cobalt oxyhydroxide and the amount of electricity actually calculated as the charge plateau from the charge curve.

In each of Examples 1 and 9, the positive electrode active material formed with the cobalt compound layer having a low conductivity was used. Accordingly, the current collectivity of the positive electrode was lower than in the case where the positive electrode active material has a cobalt compound layer with a high conductivity. To compensate for this, therefore, the cobalt oxidation efficiency is preferably enhanced. In Example 1, the cobalt oxidation efficiency was enhanced by adding cobalt having a high conductivity to the positive electrode so that the formation of the conductive network using cobalt oxyhydroxide was improved and the current collectivity of the positive electrode was improved. It is considered that, for this reason, the ratio (B/A) between utilization ratios×100(%) showed a high value. In Example 9, by contrast, cobalt hydroxide having a low conductivity was added to the positive electrode so that the cobalt oxidation efficiency lowered compared with that in Example 1 and the formation of the conductive network using cobalt oxyhydroxide was not sufficient conceivably.

Therefore, in the case of using the positive electrode active material formed with the cobalt compound layer having a low conductivity, cobalt having a high conductivity is preferably added to the positive electrode.

Example 10

In Example 10, multiple types of nickel positive electrodes were produced by adjusting the amount of the cobalt powder added in Step 3 in the range of 1 to 8 parts by weight relative to 100 parts by weight of the positive electrode active material. By adjusting the other conditions (Steps 1 to 4) in exactly the same manner as in Example 1, alkaline storage batteries were produced.

Next, characteristic evaluation was performed with respect to each of the batteries in the same manner as in Example 1. Specifically, the ratio (B/A) between utilization ratios×100 (%) was calculated for each of the alkaline storage batteries according to Example 10. As a result, the ratio (B/A) between utilization ratios×100(%) showed a high value of not less than 94% in each of the batteries in which the added amount of the cobalt powder was adjusted to a value of not less than 2 parts by weight relative to 100 parts by weight of the positive electrode active material.

In each of the batteries in which the added amount of the cobalt powder was adjusted to a value of less than 2 parts by weight relative to 100 parts by weight of the positive electrode active material, the value of the ratio (B/A) between utilization ratios×100(%) was lower by 2% or more than that in each of the batteries in which the added amount of the cobalt powder was adjusted to a value of not less than 2 parts by weight. A conceivable reason for this is that, since the added amount of cobalt for forming the conductive network was insufficient, the current collectivity of the positive electrode could not be enhanced sufficiently.

From the results, by causing cobalt to be contained at a proportion of not less than 2 parts by weight to 100 parts by weight of the positive electrode active material, the current collectivity can be improved and the active-material utilization ratio can be improved.

In each of the batteries in which the added amount of the cobalt powder was over 7 parts by weight relative to 100 parts by weight of the positive electrode active material, the filling amount of the nickel hydroxide particles was insufficient and the capacity density of the positive electrode lowered.

From the foregoing, the content of cobalt is preferably adjusted to a value of not less than 2 parts by weight and not more than 7 parts by weight relative to 100 parts by weight of the positive electrode active material.

Example 11

In Example 11, multiple types of nickel positive electrodes were produced by adjusting the amount of the yttrium oxide powder added in Step 3 in the range of 0 to 5 parts by weight relative to 100 parts by weight of the positive electrode active material. By adjusting the other conditions (Steps 1 to 4) in exactly the same manner as in Example 1, alkaline storage batteries were produced.

Then, characteristic evaluation was performed with respect to each of the batteries in the same manner as in Example 1. Specifically, the active-material utilization ratio A (utilization ratio during 1.3 A discharge) and the active-material utilization ratio B (utilization ratio during 6.5 A discharge) in the initial cycle were first calculated for each of the batteries in the same manner as in Example 1. Further, as the index showing the high-rate discharge characteristic of each of the batteries, the ratio (B/A) of the active-material utilization ratio B to the active-material utilization ratio A×100(%) was calculated.

Then, each of the batteries was charged with a current of 1.3 A at 60° C. for 1.2 hours and then discharged to release a current of 1.3 A till the battery voltage became 0.8 V. Based on the discharge capacity obtained at that time, an active-material utilization ratio F (utilization ratio during 1.3 A discharge at 60° C.) was calculated for each of the batteries. Further, as an index showing the high-temperature charge/discharge characteristic of each of the batteries, the ratio (F/A) of the active-material utilization ratio F to the active-material utilization ratio A×100(%) was calculated FIG. 4 shows the relationships among the added amount of yttrium oxide, the ratio (F/A) between utilization ratios×100 (%), and the ratio (B/A) between utilization ratios×100(%).

Figure 4:
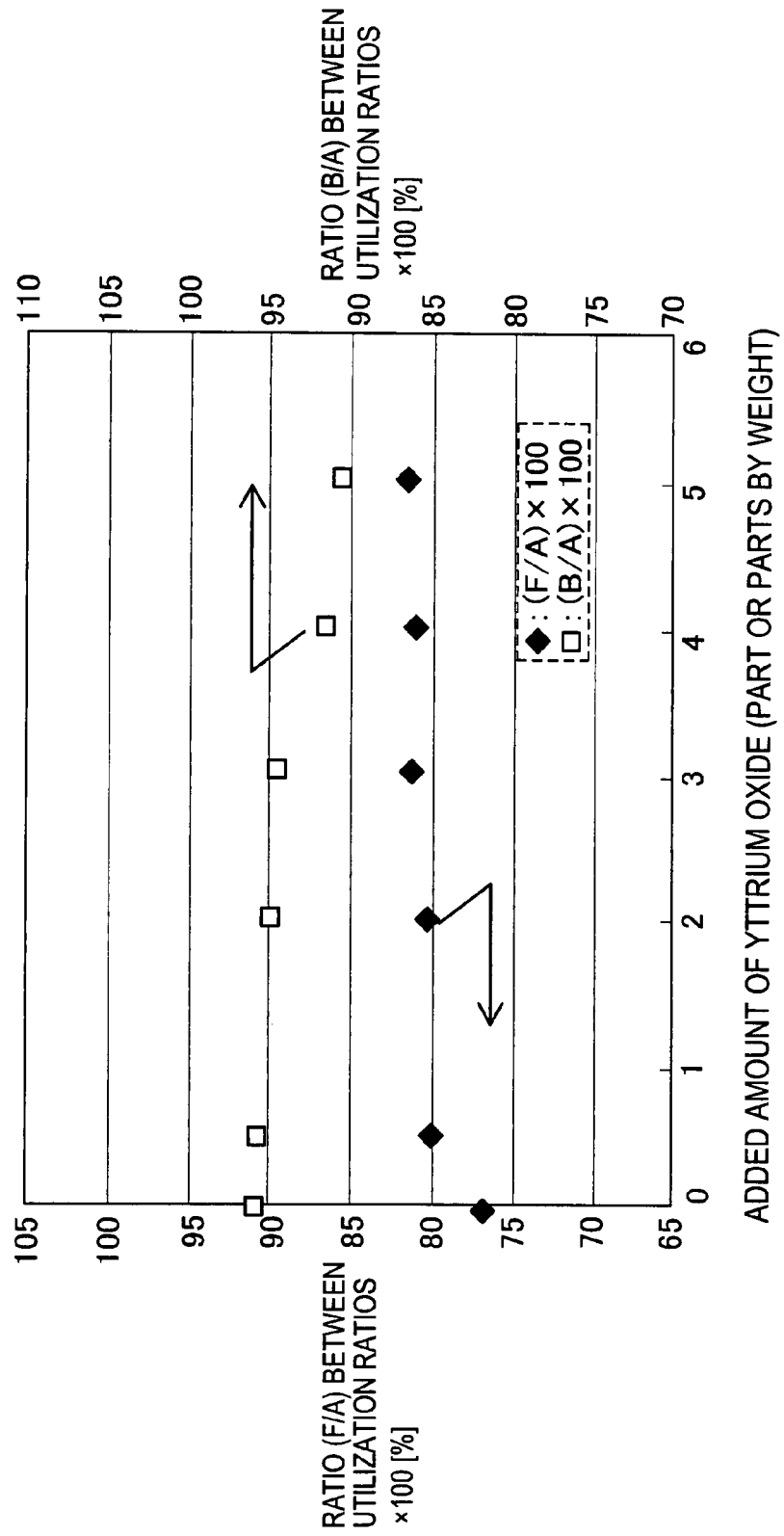
FIG. 4 is a characteristic view showing the relationships among the amount of yttrium oxide contained in a positive electrode, the ratio (F/A) between utilization ratios×100(%), and the ratio (B/A) between utilization ratios×100(%) in an alkaline storage battery according to Example 11.

As indicated by ♦ in FIG. 4, as the added amount of yttrium oxide increases, the ratio (F/A) between utilization ratios× 100(%) tends to increase. Specifically, it can be seen that the ratio (F/A) between utilization ratios×100(%) shows a high value in the range in which the added amount of yttrium oxide is not less than 0.5 parts by weight relative to 100 parts by weight of the positive electrode active material. Accordingly, by adjusting the added amount of yttrium oxide to a value of not less than 0.5 parts by weight relative to 100 parts by weight of the positive electrode active material, the high-temperature charge/discharge characteristic can be improved. In other words, charge reception performance can be improved.

By contrast, as indicated by □, as the added amount of yttrium oxide increases, the ratio (B/A) between utilization ratios×100(%) tends to lower. In particular, when the added amount of yttrium oxide is over 3 parts by weight relative to 100 parts by weight of the positive electrode active material, the ratio (B/A) between utilization ratios×100(%) significantly lowers. Therefore, to obtain an excellent high-rate discharge characteristic, it is necessary to adjust the added amount of yttrium oxide to a value of not more than 3.0 parts by weight relative to 100 parts by weight of the positive electrode active material.

From the results, the content of yttrium oxide is preferably not less than 0.5 parts by weight and not more than 3 parts by weight relative to 100 parts by weight of the positive electrode active material.

Example 12

In Example 12, a nickel positive electrode was produced without adding the cobalt powder in Step 3. By adjusting the other conditions (Steps 1 to 4) in exactly the same manner as in Example 1, an alkaline storage battery was produced.

Next, characteristic evaluation was performed with respect to the battery in the same manner as in Example 1, with the result that each of the high-rate discharge characteristic, the self-discharge characteristic, and the cycle lifetime characteristic was excellent. By further performing characteristic evaluation with respect to the battery in the same manner as in Example 11, the ratio (F/A) of the active-material utilization ratio F to the active-material utilization ratio A×100(%) was calculated as the index showing the high-temperature charge/discharge characteristic of each battery. As a result, the ratio (F/A) between active-material utilization ratios×100=76.1 (%) was satisfied.

A comparative examination will be made herein below on Examples 12 and 11. In Example 12, the cobalt powder was not added, while the yttrium oxide powder was added at a proportion of 2 parts by weight to 100 parts by weight of the positive electrode active material in the same manner as in Example 1. In Example 11, by contrast, the cobalt powder was added at a proportion of 5 parts by weight to 100 parts by weight of the positive electrode active material in the same manner as in Example 1 and the yttrium oxide powder was added in the range of 0 to 5 parts by weight. Therefore, a comparison will be made between the alkaline storage battery according to Example 12 and that one of the alkaline storage batteries in which yttrium oxide was added at a proportion of 2 parts by weight to 100 parts by weight of the positive electrode active material according to Example 11. In contrast to Example 12 in which the value of the ratio (F/A) between utilization ratios×100 was 76.1(%), the value of the ratio (F/A) between utilization ratios×100 was 80% in Example 11. Thus, by adding cobalt, the ratio (F/A) between utilization ratios×100 was higher by about 4% in Example 11 than in Example 12.

As a result of making a comparison between respective charge curves at 60° obtained from the batteries according to Examples 11 and 12, it was proved that the oxygen overvoltage significantly increased in each of the batteries in which each of the cobalt powder and the yttrium oxide powder was added. It is considered that, for this reason, the high-temperature charge/discharge characteristic was improved in each of the batteries in which each of the cobalt powder and the yttrium oxide powder was added. Therefore, each of the cobalt powder and the yttrium oxide powder is preferably added to the positive electrode.

A conceivable reason for this is as follows. It has been known that, by causing yttrium oxide to be contained in an electrode, the oxygen overvoltage is increased and the charge reception performance is improved. When cobalt is added in addition to yttrium oxide having such a property, an oxide mixture of cobalt and yttrium is generated during charging and the dispersibility of yttrium oxide is thereby improved. It is considered that, for this reason, the oxygen overvoltage unusually increases, the charge reception performance is improved, and the high-temperature charge/discharge characteristic is improved.

Although the present invention has been described in accordance with Examples 1 to 12, the present invention is not limited to the examples described above and the like. It will easily be appreciated that the present invention can be appropriately modified and applied without departing from the gist thereof.

For example, the positive electrode active materials were produced by using the nickel hydroxide particles each containing magnesium in a solid solution state in Examples 1 to 12. However, the element to be contained in each of the nickel hydroxide particles is not limited only to magnesium. By causing at least magnesium to be contained in a solid solution state, the high-rate discharge characteristic and the output characteristic can be improved. Specifically, the high-rate discharge characteristic and the output characteristic could be improved even when cobalt was caused to be contained in each of the nickel hydroxide particles in addition to magnesium.

In Examples 1 to 12, the nickel-metal hydride storage batteries each using the hydrogen absorbing alloy for the negative electrode were produced. However, in accordance with the present invention, the same effect can also be obtained from any alkaline storage battery such as a nickel-zinc storage battery or a nickel-cadmium storage battery.

In Examples 1 to 12, each of the alkaline storage batteries was formed to have a cylindrical configuration but the alkaline storage battery is not limited to such a configuration. The present invention is also applicable to an alkaline storage battery having any configuration such as an angular battery in which the layers of electrode plates are stacked in a case.

The invention claimed is:

1. A positive electrode active material powder for an alkaline storage battery, the positive electrode active material powder comprising:
   nickel hydroxide particles each containing at least magnesium in a solid solution state; and
   a cobalt compound layer coating a surface of each of the nickel hydroxide particles,
   wherein the cobalt compound layer contains cobalt having an average valence of not less than 2.6 and not more than 3.0, contains sodium at a proportion of less than 0.10 wt % to a total weight of the cobalt compound layer,
   a cobalt compound composing the cobalt compound layer primarily contains cobalt oxyhydroxide and a peak half width of the (110) plane of the cobalt compound which is located in the vicinity of $2\theta=64°$ to $67°$ in X-ray diffraction using a CuKα beam is not more than $1.5°$, and
   the positive electrode active material powder has a conductivity of the cobalt compound layer smaller than $1.0 \times 10^{-5}$ S/cm, the conductivity being measured in a state in which the positive electrode active material powder is pressurized at 39.2 MPa.

2. A positive electrode active material powder for an alkaline storage battery according to claim 1, wherein a proportion of the magnesium contained in the solid solution state in each of the nickel hydroxide particles is not less than 2 mol % and not more than 10 mol % to all metal elements contained in each of the nickel hydroxide particles.

3. A positive electrode active material powder for an alkaline storage battery according to claim 1, containing 1.0 wt % or less of a sulfate group.

4. A positive electrode active material powder for an alkaline storage battery according to claim 1, wherein a peak half width of the (101) plane of each of the nickel hydroxide particles which is located in the vicinity of $2\theta=37°$ to $40°$ in X-ray diffraction using a CuKα beam is more than $0.7°$ and not more than $1.2°$.

5. A positive electrode active material powder for an alkaline storage battery according to claim 1, having an average particle diameter of not less than 5 μm and not more than 20 μm.

6. A positive electrode active material powder for an alkaline storage battery according to claim 1, wherein the cobalt compound layer has an average thickness of not more than 0.20 μm.

7. A positive electrode active material powder for an alkaline storage battery according to claim 1, wherein a specific surface area measured by a BET method based on nitrogen gas adsorption is not less than 8.0 m²/g and not more than 1.8×10 m²/g.

8. A positive electrode active material powder for an alkaline storage battery according to claim 1, which is produced by supplying an aqueous solution containing cobalt ions into an aqueous solution containing nickel hydroxide particles, while supplying an aqueous sodium hydroxide solution into the aqueous solution containing the nickel hydroxide particles to maintain the pH thereof in a range of 11.5 to 13.5 and also supplying air thereinto.

9. A positive electrode active material powder for an alkaline storage battery according to claim 8, which is produced by adjusting a concentration of oxygen dissolved in the aqueous solution containing the nickel hydroxide particles to a value of not less than 1.0 mg/l and not more than 1.5×10 mg/l by using the air supplied into the aqueous solution containing the nickel hydroxide particles.

10. A positive electrode for an alkaline storage battery containing:
   a positive electrode active material powder for an alkaline storage battery as recited in claim 1.

11. The positive electrode for an alkaline storage battery according to claim 10, containing, in addition to the positive electrode active material powder:
   metal cobalt particles; and
   yttrium oxide particles.

12. The positive electrode for an alkaline storage battery according to claim 11, wherein the metal cobalt particles are contained at a proportion of 2 to 7 parts by weight to 100 parts by weight of the positive electrode active material powder.

13. The positive electrode for an alkaline storage battery according to claim 11, wherein the yttrium oxide particles are contained at a proportion of 0.5 to 3 parts by weight to 100 parts by weight of the positive electrode active material powder.

14. An alkaline storage battery comprising:
   a positive electrode for an alkaline storage battery as recited in claim 10.

\* \* \* \* \*